United States Patent
Patel et al.

(10) Patent No.: US 12,101,853 B2
(45) Date of Patent: *Sep. 24, 2024

(54) BASE STATION ANTENNA UNITS HAVING ARRAYS SPANNING MULTIPLE ANTENNAS THAT ARE CONNECTED BY JUMPER CABLES

(71) Applicant: CommScope Technologies LLC, Hickory, NC (US)

(72) Inventors: Sammit Patel, Dallas, TX (US); Haifeng Li, Richardson, TX (US); Peter J. Bisiules, LaGrange Park, IL (US); Amit Kaistha, Coppell, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/099,501

(22) Filed: Jan. 20, 2023

(65) Prior Publication Data

US 2023/0164883 A1 May 25, 2023

Related U.S. Application Data

(63) Continuation of application No. 17/114,649, filed on Dec. 8, 2020, now Pat. No. 11,589,418.
(Continued)

(51) Int. Cl.
*H04W 88/08* (2009.01)
*H01Q 1/42* (2006.01)

(52) U.S. Cl.
CPC .............. *H04W 88/08* (2013.01); *H01Q 1/42* (2013.01)

(58) Field of Classification Search
CPC ........ H01Q 1/1242; H01Q 1/246; H01Q 1/42; H01Q 21/0025; H01Q 21/28; H01Q 5/30; H01Q 5/42; H04W 88/08
(Continued)

(56) References Cited

U.S. PATENT DOCUMENTS 9,722,327 B2  8/2017  Zimmerman et al.
9,997,825 B2  6/2018  Hendrix et al.
(Continued)

FOREIGN PATENT DOCUMENTS

CN    102916260 A    2/2013
EP      3031098 A2    6/2016
(Continued)

OTHER PUBLICATIONS

"European Search Report corresponding to European Application No. 20199608.9, mailing date: Mar. 29, 2021, 9 pages".
(Continued)

*Primary Examiner* — Tan H Trinh
(74) *Attorney, Agent, or Firm* — Myers Bigel, P.A.

(57) ABSTRACT

Base station antenna units include a first and second base station antennas that have respective first and second housings. The first housing includes a top end cap and the second housing includes a bottom end cap. A jumper cable that includes a first connector port is mounted in one of the top end cap or the bottom end cap, and a second connector port that is configured to mate with the first connector port is mounted in the other one of the top end cap or the bottom end cap. A longitudinal axis of the first connector port extends in a vertical direction and a longitudinal axis of the second connector port extends in the vertical direction.

20 Claims, 11 Drawing Sheets

Related U.S. Application Data

(60) Provisional application No. 62/949,709, filed on Dec. 18, 2019, provisional application No. 62/975,372, filed on Feb. 12, 2020.

(58) Field of Classification Search
USPC .................................................. 455/562.1
See application file for complete search history.

(56) References Cited

U.S. PATENT DOCUMENTS

| | | | |
|---|---|---|---|
| 10,270,159 B1* | 4/2019 | Bryce | H01Q 1/22 |
| 11,589,418 B2* | 2/2023 | Patel | H01Q 21/28 |
| 2004/0150561 A1 | 8/2004 | Tillery et al. | |
| 2004/0263389 A1 | 12/2004 | Haunberger et al. | |
| 2007/0001919 A1* | 1/2007 | Carroll | H01Q 23/00 |
| | | | 455/562.1 |
| 2009/0303135 A1 | 12/2009 | Reed et al. | |
| 2010/0142420 A1 | 6/2010 | Heuer et al. | |
| 2014/0242930 A1 | 8/2014 | Barker et al. | |
| 2015/0155669 A1* | 6/2015 | Chamberlain | H01Q 1/246 |
| | | | 439/507 |
| 2017/0194704 A1 | 7/2017 | Chawgo et al. | |
| 2017/0271760 A1 | 9/2017 | Moon et al. | |
| 2018/0026379 A1 | 1/2018 | Barker et al. | |
| 2018/0331419 A1* | 11/2018 | Varnoosfaderani | H01Q 13/10 |
| 2019/0123426 A1 | 4/2019 | Bryce | |
| 2019/0334622 A1 | 10/2019 | Ho et al. | |
| 2019/0363451 A1* | 11/2019 | Harel | H01Q 21/0025 |
| 2020/0176861 A1* | 6/2020 | Bisiules | H01Q 25/00 |
| 2021/0226314 A1* | 7/2021 | Kolokotronis | H01Q 1/1228 |
| 2022/0376403 A1* | 11/2022 | Deuchst | H01Q 1/28 |

FOREIGN PATENT DOCUMENTS

| | | |
|---|---|---|
| WO | 2015026528 A2 | 2/2015 |
| WO | 2019084720 A1 | 5/2019 |

OTHER PUBLICATIONS

"European Search Report corresponding to European Application No. 21167176.3 mailing date: Jul. 27, 2021, 9 pages".

"International Search Report and Written Opinion corresponding to International Patent Application No. PCT/US2020/051026, mailed Dec. 29, 2020".

* cited by examiner

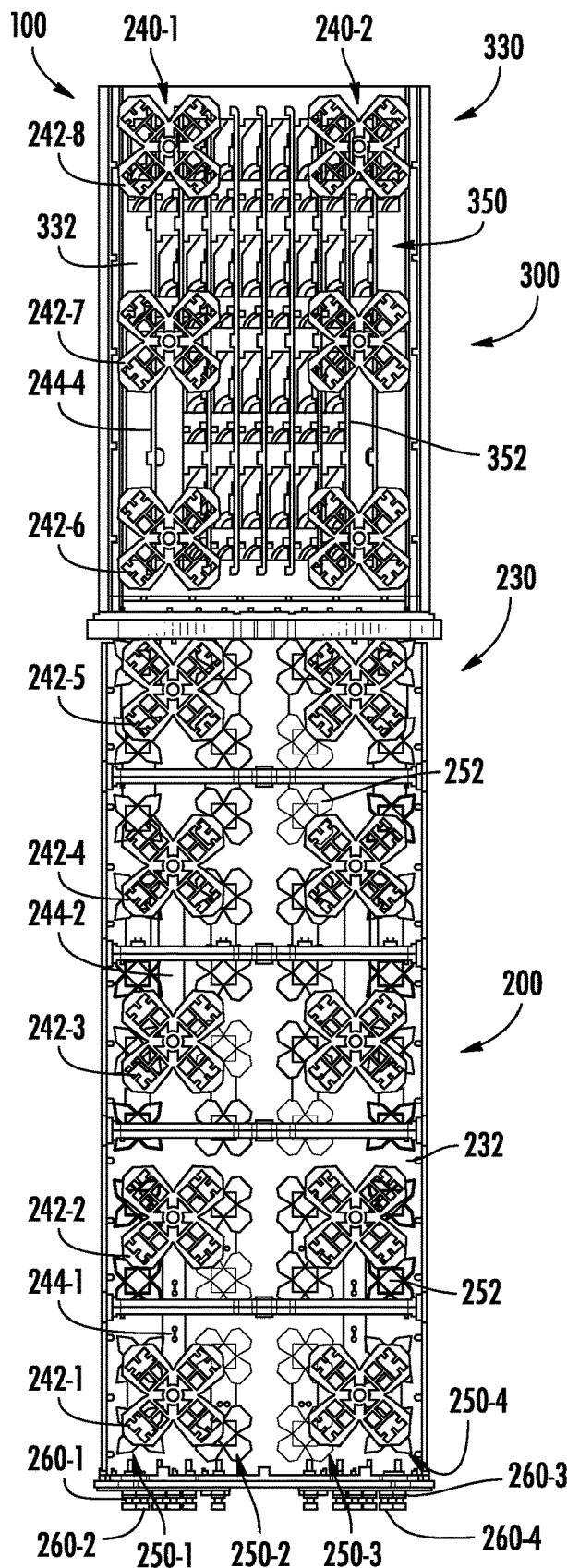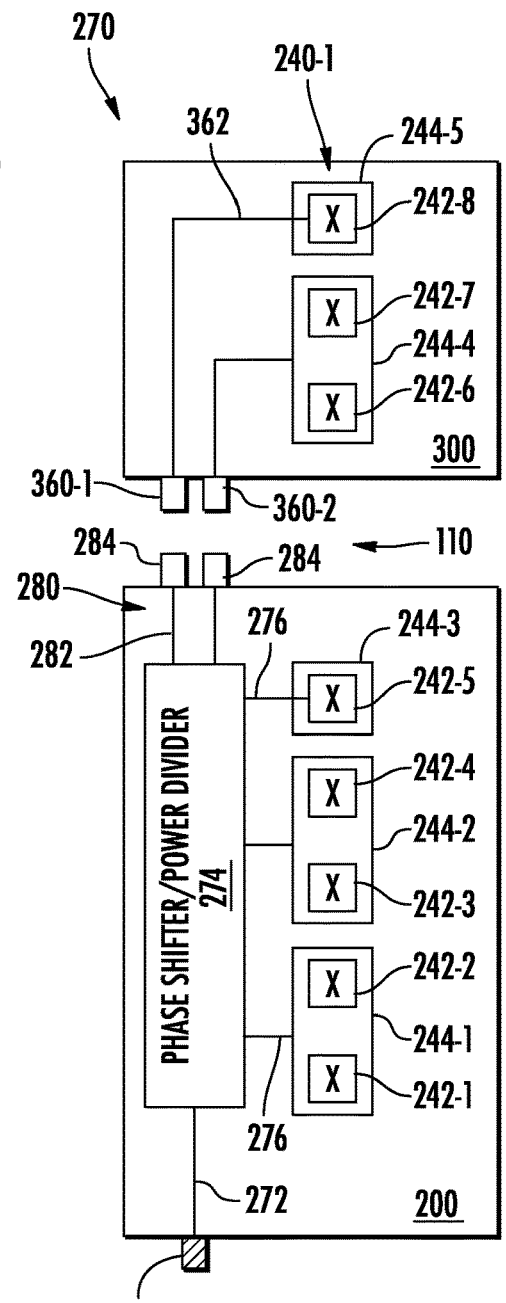
FIG. 3
FIG. 4

BASE STATION ANTENNA UNITS HAVING ARRAYS SPANNING MULTIPLE ANTENNAS THAT ARE CONNECTED BY JUMPER CABLES

CROSS-REFERENCE TO RELATED APPLICATIONS

The present application is a continuation under 35 U.S.C. § 120 of U.S. patent application Ser. No. 17/114,649, filed Dec. 8, 2020, which in turn claims priority under 35 U.S.C. § 119 to U.S. Provisional Patent Application Ser. No. 62/975,372, filed Feb. 12, 2020, and to U.S. Provisional Patent Application Ser. No. 62/949,709, filed Dec. 18, 2019, the entire content of each of the above applications is incorporated herein by reference.

BACKGROUND

The present invention generally relates to radio communications and, more particularly, to base station antennas that support communications in multiple frequency bands.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." Typically, the base station antennas are mounted on a tower or other raised structure, with the radiation patterns (also referred to herein as "antenna beams") that are generated by the base station antennas directed outwardly.

A common base station configuration is the three sector configuration in which the cell is divided into three 120° sectors in the azimuth plane. A base station antenna is provided for each sector. In a three sector configuration, the antenna beams generated by each base station antenna typically have a Half Power Beamwidth ("HPBW") in the azimuth (horizontal) plane of about 65° so that the antenna beams provide good coverage throughout a 120° sector. Typically, each base station antenna will include one or more vertically-extending columns of radiating elements that are typically referred to as "linear arrays." Each radiating element may have a HPBW of approximately 65°. By providing a column of radiating elements extending along the elevation (vertical) plane, the elevation HPBW of the antenna beam may be narrowed to be significantly less than 65°, with the amount of narrowing increasing with the length of the column in the vertical direction. Typically, the radiating elements in a linear array are spaced apart from adjacent radiating elements at a fixed distance that is based on the operating frequency band of the radiating elements and performance requirements for the array. The number of radiating elements included in the linear array may then be selected so that the linear array will have a length that provides a desired elevation beamwidth.

The desired elevation beamwidth for a linear array of radiating elements will depend upon the size and geography of the cell in which the base station antenna is deployed. In order to meet cellular operator requirements, base station antenna manufacturers typically sell multiple versions of many base station antenna models that have different array lengths and hence elevation beamwidths. For example, in some cases, it may be desirable to have a small elevation beamwidth (e.g., 10-15 degrees) in order to increase the antenna gain and/or to reduce spillover of the antenna beam into adjacent cells (as such spillover appears as interference in the adjacent cells). This requires relatively long linear arrays. In other cases, larger elevation beamwidths are acceptable, allowing the use of shorter linear arrays that have fewer radiating elements.

In order to accommodate the increasing volume of cellular communications, new frequency bands are being made available for cellular service. Cellular operators now typically deploy multi-band base station antennas that include arrays of radiating elements that operate in different frequency bands to support service in these new frequency bands. For example, most base station antennas now include both "low-band" linear arrays of radiating elements that provide service in some or all of the 617-960 MHz frequency band and "mid-band" linear arrays of radiating elements that provide service in some or all of the 1427-2690 MHz frequency band. There is also interest in deploying base station antennas that include one or more arrays of "high-band" radiating elements that operate in higher frequency bands, such as some or all of the 3.3-4.2 GHz and/or the 5.1-5.8 GHz frequency bands. The high-band arrays are often implemented as multi-column arrays of radiating elements that can be configured to perform active beamforming where the shape of the antenna beam generated by the array can be controlled to form higher directivity antenna beams that support higher throughput. When beamforming arrays are used, a beamforming radio is often mounted directly on the back of the base station antenna in order to reduce RF losses. However, because the requirements for the beamforming antennas are more likely subject to change, and because beamforming antennas may experience higher failure rates, cellular operators may sometimes prefer that the beamforming antennas be implemented as separate antennas.

Unfortunately, there are various disadvantages associated with deploying additional base station antennas. First, a separate charge typically applies for each base station antenna mounted on an antenna tower, and hence increasing the number of antennas typically results in increased installation costs. Second, cellular operators often lease space on antenna towers, and there is typically a separate leasing charge for each item of equipment mounted on the antenna tower. Third, local ordinances and/or zoning regulations may limit the number of base station antennas that can be mounted on an antenna tower, and hence additional antenna towers may need to be erected if the number of base station antennas required exceeds the number permitted by the local zoning ordinances.

When shorter base station antennas are used, it may be possible to mount two base station antennas in a vertically stacked fashion so that the two base station antennas may appear as a single antenna. For example, as disclosed in U.S. Patent Publication No. 2019/0123426, the entire content of which is incorporated herein by reference, first and second base station antennas may be mounted together in a vertically stacked arrangement so that the composite base station antenna unit has the appearance of a single base station antenna. The first base station antenna may comprise a conventional dual-band base station antenna that includes low-band and mid-band arrays of radiating elements, and may have a height (i.e., the length of the antenna in the vertical direction that is perpendicular to the plane defined by the horizon when the antenna is mounted for use) may be, for example, in the range of about 1.0 meters to about 2.0 meters. The second base station antenna may comprise, for example, a beamforming antenna that operates in, for example, a portion of the 3.3-4.2 GHz or 5.1-5.8 GHz frequency bands. The height of the second base station antenna may be for example, less than about 1.0 meters.

SUMMARY

Pursuant to embodiments of the present invention, base station antenna units are provided that include a first base station antenna that comprises a first housing that includes a first radome and a top end cap, a second base station antenna that comprises a second housing that includes a second radome and a bottom end cap, a jumper cable that includes a first connector port that is mounted in one of the top end cap or the bottom end cap, and a second connector port that is configured to mate with the first connector port, the second connector port mounted in the other one of the top end cap or the bottom end cap. A first longitudinal axis of the first connector port extends in a vertical direction and a second longitudinal axis of the second connector port extends in the vertical direction.

In some embodiments, the first and second base station antennas may be mounted in a vertically stacked arrangement, and a bottommost surface of the second base station antenna may be within 1 inch of a topmost surface of the first base station antenna.

In some embodiments, the jumper cable may be a retractable jumper cable. In some embodiments, the retractable jumper cable may be one of a plurality of jumper cables, and each of the plurality of retractable jumper cables may include a respective cable and a respective first connector port, and the second connector port may be one of a plurality of second connector ports, and each of the retractable jumper cables may be configured to mate with a respective one of the second connector ports. Each of the plurality of retractable jumper cables may be mounted in either the top end cap or the bottom end cap, and each of the associated second connector ports may be mounted in the other one of the top end cap or the bottom end cap in some embodiments. In some embodiments, at least two of the first connector ports may be mounted in a common connector support that is moveable between a disconnected position and a connected position. The first connector ports may be push-pull connector ports in some embodiments.

In some embodiments, the top end cap may include a compartment that has a front wall and a pair of side walls, and the plurality of retractable jumper cables may be mounted in the compartment. The top end cap may also include a cover that forms a back wall of the compartment. The cover may comprise, for example, a sliding cover, a pivoting cover or a removable cover.

In some embodiments, the cables of the retractable jumper cables may be configured to retract inside one of the first housing and the second housing. In some embodiments, the bottom end cap may include a compartment that includes a front wall and a pair of side walls, and the plurality of retractable jumper cables are mounted in the compartment. The bottom end cap may further include a sliding cover, a pivoting cover or a removable cover that forms a back wall of the compartment.

In some embodiments, the second connector ports may extend into the compartment when the second base station antenna is vertically stacked on the first base station antenna. In some embodiments, a horizontal width of the first radome may be substantially the same as a horizontal width of the second radome.

In some embodiments, the first base station antenna may further include a first radio frequency ("RF") port and a first array of radiating elements that are coupled to the first RF port and a second RF port and a first portion of a second array of radiating elements that are connected to the second RF port, and the second base station antenna may include a third RF port and a third array of radiating elements that are coupled to the first RF port, and a second portion of the second array of radiating elements.

In some embodiments, the base station antenna unit may further comprise a first array of first frequency band radiating elements that spans the first base station antenna and the second base station antenna, and a first phase shifter that is connected to each of the first frequency band radiating elements in the first array. The base station antenna unit may also include a second array of second frequency band radiating elements that spans the first base station antenna and the second base station antenna, and a second phase shifter that is connected to each of the second frequency band radiating elements in the second array. The base station antenna unit may further include a first diplexer in the first base station antenna and a second diplexer in the second base station antenna, where the first diplexer includes a first port that is coupled to the first phase shifter, a second port that is coupled to the second phase shifter, and a common port that is coupled to the second diplexer. The base station antenna unit may also include a second diplexer that includes a first port that is coupled to at least one of the first frequency band radiating elements in the second base station antenna, a second port that is coupled to at least one of the second frequency band radiating elements in the second base station antenna, and a common port that is coupled to the common port of the first diplexer. The first diplexer may be connected to the second diplexer via a jumper cable connection.

Pursuant to further embodiments of the present invention, base station antenna units are provided that include a first base station antenna that comprises a first housing that includes a first radome and a top end cap, a second base station antenna that comprises a second housing that includes a second radome and a bottom end cap, a retractable jumper cable that includes a first connector port that is mounted in one of the top end cap or the bottom end cap, and a second connector port that is configured to mate with the first connector port, the second connector port mounted in the other one of the top end cap or the bottom end cap.

In some embodiments, the first and second base station antennas may be mounted in a vertically stacked arrangement, and a bottom surface of the second base station antenna may be within 1 inch of a top surface of the first base station antenna.

In some embodiments, the retractable jumper cable may comprise one of a plurality of jumper cables, each of the plurality of retractable jumper cables including a respective cable and a respective first connector port, and the second connector port may comprise one of a plurality of second connector ports, and each of the retractable jumper cables may also be configured to mate with a respective one of the second connector ports. Each of the plurality of retractable jumper cables may be mounted in either the top end cap or the bottom end cap, and each of the associated second connector ports may be mounted in the other one of the top end cap or the bottom end cap. Moreover, at least two of the first connector ports may optionally be mounted in a common connector support that is moveable between a disconnected position and a connected position.

In some embodiments, the top end cap may include a compartment that has a front wall and a pair of side walls, and the plurality of retractable jumper cables may be mounted in the compartment. The top end cap may also include a cover that forms a back wall of the compartment.

In some embodiments, the cables of the retractable jumper cables may be configured to retract inside one of the first housing and the second housing.

In some embodiments, the bottom end cap may include a compartment, and the plurality of retractable jumper cables may be mounted in the compartment. In some embodiments, the second connector ports may extend into the compartment when the second base station antenna is vertically stacked on the first base station antenna.

In some embodiments, the first base station antenna may further include a first RF port and a first array of radiating elements that are coupled to the first RF port and a second RF port and a first portion of a second array of radiating elements that are connected to the second RF port, and the second base station antenna may further include a third RF port and a third array of radiating elements that are coupled to the first RF port, and a second portion of the second array of radiating elements.

In some embodiments, a longitudinal axis of the first connector port may extend in a vertical direction and a longitudinal axis of the second connector port may also extend in the vertical direction.

In some embodiments, the base station antenna unit may further include a first array of first frequency band radiating elements that spans the first base station antenna and the second base station antenna, a first phase shifter that is connected to each of the first frequency band radiating elements in the first array, a second array of second frequency band radiating elements that spans the first base station antenna and the second base station antenna, and a second phase shifter that is connected to each of the second frequency band radiating elements in the second array. Moreover, the base station antenna unit may also include a first diplexer in the first base station antenna and a second diplexer in the second base station antenna, where the first diplexer includes a first port that is coupled to the first phase shifter, a second port that is coupled to the second phase shifter, and a common port, and the second diplexer includes a first port that is coupled to at least one of the first frequency band radiating elements in the second base station antenna, a second port that is coupled to at least one of the second frequency band radiating elements in the second base station antenna, and a common port that is coupled to the common port of the first diplexer.

Pursuant to still further embodiments of the present invention, base station antenna assemblies are provided that include a first base station antenna that comprises a first housing that includes a first radome and a top end cap, a second base station antenna that comprises a second housing that includes a second radome and a bottom end cap, a plurality of jumper cables that each include a cable and a first connector port, each of the cables extending through one of the top end cap or the bottom end cap, a moveable connector support, wherein at least two of the first connector ports are mounted on and movable with the connector support, and a plurality of second connector ports that are configured to mate with respective ones of the first connector ports, the second connector ports mounted in the other one of the top end cap or the bottom end cap.

In some embodiments, the first and second base station antennas may be mounted in a vertically stacked arrangement, and where a longitudinal axis of each of the first connector ports may extend in a vertical direction and a longitudinal axis of each of the second connector ports may also extend in the vertical direction.

In some embodiments, the moveable connector support may be attached to one of the first base station antenna and the second base station antenna via at least two of the jumper cables. In some embodiments, each of the jumper cables may comprise a retractable jumper cable.

In some embodiments, the top end cap may include a compartment, and the plurality of retractable jumper cables may be mounted in the compartment.

In some embodiments, the cables of the retractable jumper cables may be configured to retract inside one the first housing.

In some embodiments, the second connector ports may extend into the compartment when the second base station antenna is vertically stacked on the first base station antenna.

In some embodiments, the first base station antenna may further include a first RF port and a first array of radiating elements that are coupled to the first RF port and a second RF port and a first portion of a second array of radiating elements that are connected to the second RF port, and the second base station antenna may include a third RF port and a third array of radiating elements that are coupled to the first RF port, and a second portion of the second array of radiating elements.

In some embodiments, the base station antenna unit may further include a first array of first frequency band radiating elements that spans the first base station antenna and the second base station antenna, a first phase shifter that is connected to each of the first frequency band radiating elements in the first array, a second array of second frequency band radiating elements that spans the first base station antenna and the second base station antenna, and a second phase shifter that is connected to each of the second frequency band radiating elements in the second array. In some embodiments, the base station antenna unit may further include a first diplexer in the first base station antenna and a second diplexer in the second base station antenna, where the first diplexer includes a first port that is coupled to the first phase shifter, a second port that is coupled to the second phase shifter, and a common port, and the second diplexer includes a first port that is coupled to at least one of the first frequency band radiating elements in the second base station antenna, a second port that is coupled to at least one of the second frequency band radiating elements in the second base station antenna, and a common port that is coupled to the common port of the first diplexer.

Pursuant to still further embodiments of the present invention, base station antenna units are provided that include a first base station antenna, a second base station antenna that is stacked above the first base station antenna, a first array of first frequency band radiating elements that spans the first base station antenna and the second base station antenna, a second array of second frequency band radiating elements that spans the first base station antenna and the second base station antenna, and a first diplexer that has a first frequency selective port that is coupled to a subset of the first frequency band radiating elements of the first array and a second frequency selective port that is coupled to a subset of the second frequency band radiating elements of the second array.

In some embodiments, the base station antenna unit may further include a first phase shifter that is coupled to each of the first frequency band radiating elements in the first array and a second phase shifter that is coupled to each of the second frequency band radiating elements in the second array.

In some embodiments, the base station antenna unit may further include a second diplexer that includes a first frequency selective port that is coupled to the first phase shifter, a second frequency selective port that is coupled to the first phase shifter, and a common port that is coupled to a common port of the first diplexer.

In some embodiments, the common port of the first diplexer may be connected to the common port of the second diplexer by a jumper cable.

In some embodiments, the jumper cable may extend between a top end cap of the first base station antenna and a bottom end cap of the second base station antenna.

BRIEF DESCRIPTION OF THE DRAWINGS

FIG. 3 is a front view of the base station antenna unit of FIG. 1 with the radomes of the base station antennas removed.

FIG. 4 is a schematic block diagram of the feed network for one of the low-band linear arrays included in the base station antenna of FIG. 1.

Figures 1, 2:
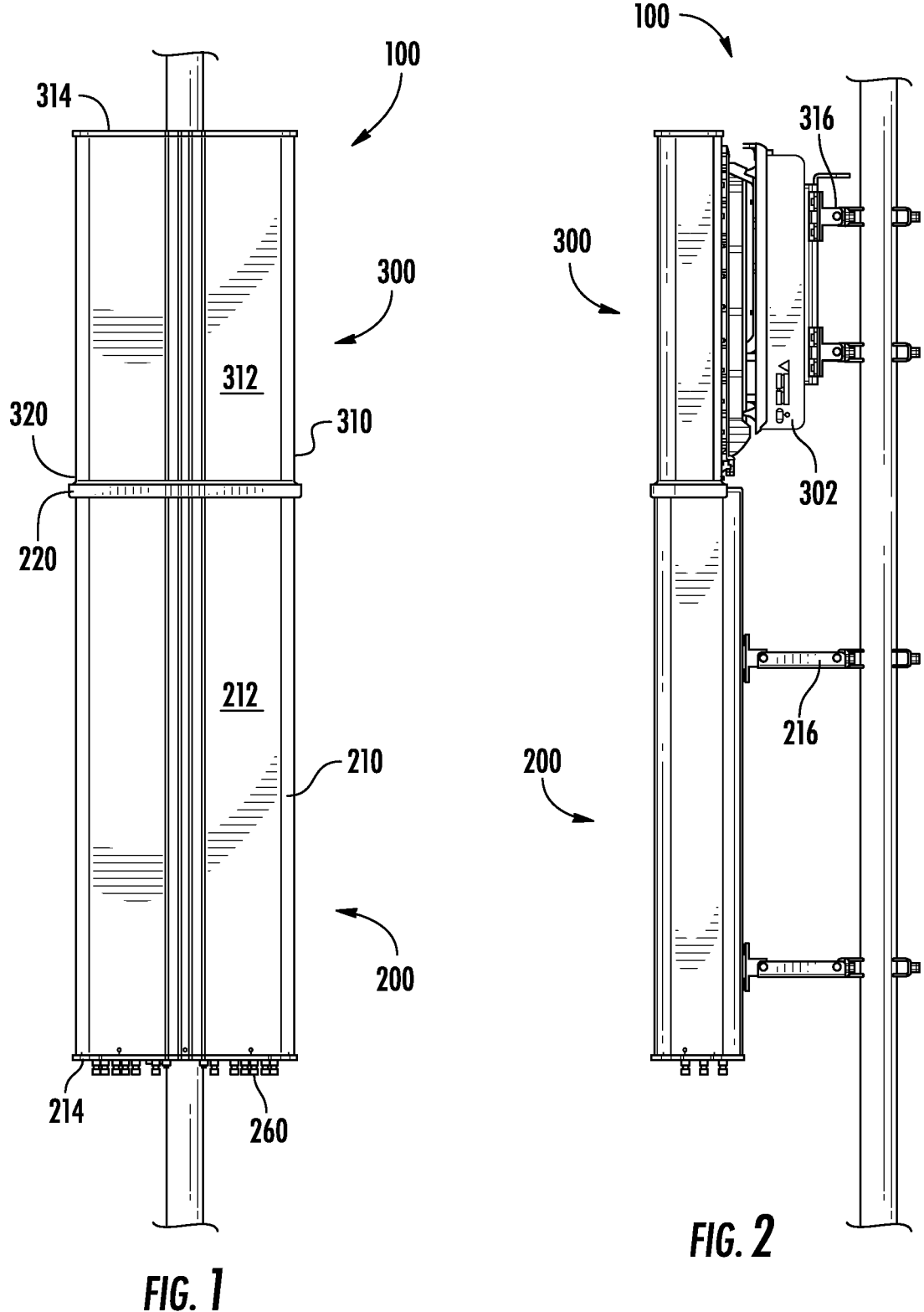
FIG. 1 is a front view of a base station antenna unit according to embodiments of the present invention.
FIG. 2 is a side view of the base station antenna unit of FIG. 1.

Herein, when multiple like elements are present they may be referred to using a two part reference number. Such elements may be referred to individually by their full reference numeral, and may be referred to collectively by the first part of their reference numeral (i.e., the part prior to the hyphen).

DETAILED DESCRIPTION

As discussed above, it is known to vertically stack a first base station antenna that includes a high-band array on top of a conventional base station antenna that includes one or more low-band or mid-band arrays of radiating elements so that the two base station antennas appear as a single antenna unit. While this approach works fine if the low-band linear arrays have a relatively wide elevation beamwidth requirement, the antenna unit may become too long if the low-band linear arrays must have a relatively narrow elevation beamwidth, since this requirement increases the length of the conventional base station antenna, such that zoning regulations or aesthetic considerations may preclude vertically stacking the two base station antennas.

The present invention is directed to base station antenna units that include first and second base station antennas. The first base station antenna may include a portion of a first linear array of radiating elements and the second base station antenna may include a second array of radiating elements. A third array of radiating elements may span both the first and second base station antennas. RF connections may be provided between the first and second base station antennas that allow sub-components of RF feed signals for the third array that are input to the first antenna to be passed to the portion of the third array that is implemented in the second base station antenna.

Certain advantages in terms of reduced cost and/or enhanced performance may be achieved when the above-discussed first and second base station antennas are stacked vertically. However, when the antennas are vertically stacked, there may be challenges in providing RF connections between the two vertically stacked antennas. Conventionally, RF connector ports are located on the bottom end caps of base station antennas, as this protects against the ingress of water into the interior of the antenna through the connector ports and/or the openings for the connector ports in the bottom end cap. However, when the second base station is stacked directly (or almost directly) on top of the first base station antenna, it is not possible to mount the RF connector ports in a conventional fashion. Embodiments of the present invention provide techniques for providing RF connections between the first and second base station antennas that may be easy to install, aesthetically pleasing, and exhibit low insertion loss, while maintaining good sealing performance.

In particular, pursuant to some embodiments of the present invention, base station antenna assemblies are provided which include a first antenna that has a plurality of retractable jumper cables that are terminated with first connector ports and a second antenna that includes a plurality of second connector ports that are configured to mate with the first connector ports. The retractable jumper cables may be used to form a plurality of RF connections between the first base station antenna and the second base station antenna.

In some embodiments, the first base station antenna may be the lower of two base station antennas that are mounted in a vertically stacked arrangement, and the retractable jumper cables may be mounted in a top end cap of the first base station antenna. In such embodiments, the second connector ports may be mounted in the bottom end cap of the upper one of the two vertically stacked base station antennas. The upper surface of the top end cap of the first base station antenna may be recessed to form a compartment, and the end of each retractable jumper cable that includes the first connector port may extend from the interior of the first base station antenna into the compartment. The second connector ports of the second (upper) base station antenna may also extend though the recess in the upper surface of the top end cap of the first (lower) base station antenna and into the compartment. In other embodiments, the retractable jumper cables may be mounted in the bottom end cap of the upper one of the two vertically stacked base station antennas and the second connector ports may be mounted in the top end cap of the bottom one of the two vertically stacked base station antennas.

In some embodiments, the first connector ports may be mounted in a common connector support that is moveable between a disconnected position and a connected position. In such embodiments, the first connector ports may be push-pull connector ports that may be mated with the second connector ports by simply pushing the two connector ports together. The common connector support may allow an installer to connect all of the first connector ports to their corresponding second connector ports in a single operation, and may help reduce or prevent misconnections.

Pursuant to further embodiments of the present invention, base station antenna units are provided that include a first base station antenna and a second base station antenna that is stacked above the first base station antenna. These base station antenna units include a first array of first frequency band radiating elements that spans the first base station antenna and the second base station antenna and a second array of second frequency band radiating elements that also spans the first base station antenna and the second base station antenna. These antenna units further include a first diplexer that has a first frequency selective port that is coupled to a subset of the first frequency band radiating elements of the first array and a second frequency selective port that is coupled to a subset of the second frequency band radiating elements of the second array.

In some embodiments, the base station antenna units may further include a first phase shifter that is coupled to each of the first frequency band radiating elements in the first array and a second phase shifter that is coupled to each of the second frequency band radiating elements in the second array. The base station antenna units may also include a second diplexer that has a first frequency selective port that is coupled to the first phase shifter, a second frequency selective port that is coupled to the first phase shifter, and a common port that is coupled to a common port of the first diplexer. The common port of the first diplexer may be connected to the common port of the second diplexer by a jumper cable. In some embodiments, jumper cable may extend between a top end cap of the first base station antenna and a bottom end cap of the second base station antenna.

Embodiments of the present invention will now be described in further detail with reference to the attached figures.

FIGS. 1-17 illustrate a base station antenna unit 100 according to certain embodiments of the present invention. The base station antenna unit 100 includes a first base station antenna 200 and a second base station antenna 300. In the description that follows, the base station antenna unit 100 will be described using terms that assume that the base station antennas 200, 300 are mounted on a tower or other structure with the longitudinal axis of each antenna 200, 300 extending along a vertical axis and the front surface of each antenna 200, 300 mounted opposite the tower.

Referring first to FIGS. 1-2, the base station antenna assembly 100 includes the first base station antenna 200 and the second base station antenna 300. The second base station antenna 300 is mounted on top of the first base station antenna 200 so that the two antennas 200, 300 are in a vertically stacked arrangement. The second base station antenna 300 may be in direct contact with the first base station antenna 200 or may be separated from the first base station antenna by a small gap such as a gap that is less than six inches, less than four inches, less two inches, less than one inch, or less than one-half of an inch in various embodiments. The first and second base station antennas 200, 300 may each have the same width (or at least approximately the same width). As a result, the two base station antennas 200, 300 may appear as a single antenna when viewed from the front.

The first base station antenna 200 includes a housing 210 that includes a radome 212, a bottom end cap 214 and a top end cap 220. The radome 212 may extend around the entire circumference of the first base station antenna 200 to form a tube or may have a front wall and a pair of side walls that connect to a backplate of an internal frame of the first base station antenna 200. The bottom end cap 214 and/or the top end cap 220 may be formed integrally with the radome, although more typically that are separate elements that are mated with the radome 212. One or more mounting brackets 216 may be provided on the rear side of the first base station antenna 200 which may be used to mount the antenna 200 on, for example, an antenna tower. A plurality of RF connector ports 260 are mounted in the bottom end cap 214 that may be used to connect radio ports to the first base station antenna 200. An antenna assembly 230, which will be discussed in further detail with reference to FIG. 3, is mounted within the housing 210. The antenna assembly 230 may be slidably inserted into the housing 210 before the bottom end cap 214 is attached to the radome 212. The first base station antenna 200 is typically mounted in a vertical configuration (i.e., its longitudinal axis may be generally perpendicular to a plane defined by the horizon) when the antenna 200 is mounted for normal operation.

The second base station antenna 300 includes a housing 310 that comprises a radome 312, a top end cap 314 and a bottom end cap 320. The radome 312 may extend around the entire circumference of the second base station antenna 300 to form a tube or may have a front wall and a pair of side walls that connect to a backplate of an internal frame of the second base station antenna 300. Either the top end cap 314 or the bottom end cap 320 may, in some embodiments, be formed integrally with the radome 312. An antenna assembly 330, which will be discussed in further detail with reference to FIG. 3, is mounted within the housing 310. The antenna assembly 330 may be slidably inserted into the housing 310 before the bottom end cap 320 is attached to the radome 312. A radio 302 is mounted on the back surface of the second base station antenna 300. The radio 302 may be a beamforming radio in some embodiments. A plurality of blind mate RF connector ports (not visible) may be provided on the back surface of the second base station antenna 300 that are configured to mate with corresponding blind mate RF connector ports (not shown) on the front surface of radio 302 when the radio 302 is mounted on the second base station antenna 300. Suitable means for mounting the radio 302 on the second base station antenna 300 and for implementing the RF connections between the radio 302 and the second base station antenna 300 are disclosed in PCT Application Ser. No. PCT/US2019/054661, the entire content of which is incorporated herein by reference as if set forth in its entirety. Mounting brackets 316 may be used to mount the radio 302 and the second base station antenna 300 on an antenna tower or other mounting structure. The second base station antenna 300 is also mounted in a vertical configuration.

FIG. 3 is a front view of the antenna unit 100 with the radomes 212, 312 of the first and second base station antennas 200, 300 removed.

As shown in FIG. 3, the antenna assembly 230 of the first base station antenna 200 includes a main backplane 232 that includes a generally flat, metallic surface and optional sidewalls. The backplane 232 may serve as both a structural component for the antenna assembly 230 and as a ground plane and reflector for the radiating elements mounted thereon. Various mechanical and electronic components of the antenna 200 (not visible in FIG. 3) such as phase shifters, remote electronic tilt units, mechanical linkages, controllers, diplexers, and the like, may be mounted behind the backplane 232. As these components are conventional, further description thereof will be omitted.

As is also shown in FIG. 3, the first base station antenna 200 includes portions of two linear arrays 240-1, 240-2 of low-band radiating elements 242 as well as four linear arrays 250-1 through 250-4 of mid-band radiating elements 252. The low-band radiating elements 242 are mounted to extend forwardly from the backplane 232 and are mounted in two columns. Each low-band radiating element 242 is implemented as a slant +/−45° cross-dipole radiating element. The low-band radiating elements 242 may be configured to transmit and receive signals in a first frequency band such as, for example, the 617-960 MHz frequency range or a portion thereof (e.g., the 617-896 MHz frequency band, the 696-960 MHz frequency band, etc.). The mid-band radiating elements 252 may likewise be mounted to extend forwardly from the backplane 232 and are mounted in four columns to form the four linear arrays 250-1 through 250-4. Linear arrays 250-1 and 250-4 extend along the respective side edges of the backplane 232 while linear arrays 250-2, 250-3 extend down the center of the backplane 232. The mid-band radiating elements 252 may be configured to transmit and receive signals in a second frequency band. Such as, for example, the 1427-2690 MHz frequency range or a portion thereof (e.g., the 1710-2200 MHz frequency band, the 2300-2690 MHz frequency band, etc.). Low-band array 240-1 extends between mid-band arrays 250-1 and 250-2, and low-band array 240-2 extends between mid-band arrays 250-3 and 250-4, As further shown in FIG. 3, the antenna assembly 330 of the second base station antenna 300 includes a main backplane 332 that includes a generally flat, metallic surface and optional sidewalls. The backplane 332 may serve as both a structural component for the antenna assembly 330 and as a ground plane and reflector for the radiating elements mounted thereon. Various mechanical and electronic components of the second base station antenna 300 (not visible in FIG. 3) such as phase shifters, remote electronic tilt units, mechanical linkages, controllers, diplexers, and the like, may be mounted behind the backplane 332.

As is also shown in FIG. 3, the second base station antenna 300 includes the remaining portions of the two linear arrays 240-1, 240-2 of low-band radiating elements 242 as well as a planar, eight-column array 350 of high-band radiating elements 352. The low-band radiating elements 242 are mounted to extend forwardly from the backplane 332 and are mounted in two columns. The low-band radiating elements 242 may be identical to the low-band radiating elements 242 included in the first base station antenna 200, and hence further description thereof will be omitted. The high-band radiating elements 352 are mounted to extend forwardly from the backplane 332 and are arranged in eight columns to operate as a beamforming array. The high-band radiating elements 352 may be configured to transmit and receive signals in a third frequency band such as, for example, the 3300-4200 MHz frequency range or a portion thereof.

As can also be seen in FIG. 3, the low-band radiating elements 242 are mounted on feedboards 244. For example, in linear array 240-1, low-band radiating elements 242-1 and 242-2 are mounted on a first feedboard 244-1, low-band radiating elements 242-3 and 242-4 are mounted on a second feedboard 244-2, and low-band radiating element 242-5 is mounted on a third feedboard 244-3. Each feedboard 244 couples an RF signal input thereto to the one or more radiating elements 242 that are mounted on the feedboard 244. Thus, for example, feedboard 244-1 splits an RF signal input thereto into two sub-components and couples the two sub-components of the RF signal to the respective radiating elements 242-1, 242-2. A feedboard 244 that only includes a single radiating element 242 may couple the entirety of the RF signals input thereto to the radiating element 242 mounted thereon.

As shown in FIG. 3, each linear array 240-1, 240-2 of low-band radiating elements 242 extends across or "spans" both the first base station antenna 200 and the second base station antenna 300. The RF connector ports 260 that feed signals to the low-band linear arrays 240-1, 240-2 are mounted in the bottom end cap 214 of the first base station antenna 200. In particular, first and second RF connector ports 260-1, 260-2 are provided that feed first and second RF signals to the respective +45° and −45° radiators of the cross-polarized low-band radiating elements 242 of linear array 240-1 (one RF connector port 260 for each polarization), and third and fourth RF connector ports 260-3, 260-4 are provided that feed first and second RF signals to the respective +45° and −45° radiators of the cross-polarized low-band radiating elements 242 of linear array 240-2 (again, one RF connector port 260 for each polarization).

While the radiating elements in each of the low-band linear arrays 240 and the mid-band linear arrays 250 are all aligned along respective vertical axes, it will be appreciated that the term "linear array" as used herein includes staggered linear arrays in which some of the radiating elements are staggered in the horizontal direction with respect to other of the radiating elements so that the radiating elements do not extend perfectly along a vertical axis.

FIG. 4 is a block diagram that schematically illustrates the feed network 270 for first polarization RF signals (e.g., +45° polarization RF signals) for low-band linear array 240-1. It will be appreciated that identical feed networks may be used for the second polarization RF signals fed to linear array 240-1 and for the first and second polarization RF signals that are fed to linear array 240-2.

As shown in FIG. 4, RF connector port 260-1 of the first base station antenna 200 is connected (e.g., by a coaxial cable 272) to a phase shifter/power divider unit 274. The phase shifter/power divider unit 274 splits the RF signal into five sub-components and applies a phase taper across those sub-components that is based on a setting of the phase shifter power/divider unit 274, as is well known to those of ordinary skill in the art. The phase taper (if any) that is applied may be used to electronically change the elevation or "tilt" angle of the antenna beam formed by the first polarization radiators of the radiating elements 242 of linear array 240-1. Three of the outputs of the phase shifter/power divider unit 274 are connected by coaxial feed cables 276 to the three feedboards 244 for linear array 240-1 that are included in the first base station antenna 200. A total of five low-band radiating elements 242 are mounted on these three feedboards 244, namely low-band radiating elements 240-1 and 240-2 are mounted on feedboard 244-1, low-band radiating elements 240-3 and 240-4 are mounted on feedboard 244-2, and low-band radiating element 240-5 is mounted on feedboard 244-3.

As is further shown in FIG. 4, the remaining two outputs of phase shifter/power divider unit 274 are connected (either directly or indirectly) to coaxial jumper cables 280. Each coaxial jumper cable 280 includes at least a cable 282 and an RF connector port 284 that is mounted on an end of the cable 282 that is opposite the phase shifter/power divider unit 274. A pair of RF connector ports 360-1, 360-2 are provided on the second base station antenna 300 that are configured to mate with RF connector ports 284 provided on the coaxial jumper cables 280. RF connector ports 360-1, 360-2 are connected by coaxial feed cables 362 to the two feedboards 244 for linear array 240-1 that are included in the second base station antenna 300. A total of three low-band radiating elements 242 are mounted on these two feedboards 244, namely low-band radiating elements 240-6 and 240-7 are mounted on feedboard 244-4, and low-band radiating element 240-8 is mounted on feedboard 244-5.

The first base station antenna 200 includes eight additional RF connector ports 260 that are connected to the mid-band linear arrays (two RF connector ports are connected to each linear array, one for each polarization) to pass RF signals between the mid-band linear arrays 250 and associated radios. These RF connector ports 260 and the feed networks connecting these RF connector ports 260 to the respective mid-band linear arrays 250 may be conventional, and hence further description thereof will be omitted here. Likewise, the second base station antenna 300 includes sixteen additional RF connector ports (not shown) that are connected to the high-band array 350 (two RF connector ports are connected to each column of the eight-column array, one for each polarization) to pass RF signals between the high-band array 350 and radio 302. These RF connector ports and the feed networks connecting these RF connector ports to the respective arrays may have, for example, any of the designs shown in PCT Application Ser. No. PCT/US2019/054661, and hence further description thereof will be omitted here.

It will be appreciated that FIGS. 1-4 illustrate one example of a base station antenna unit according to embodiments of the present invention, and that many modifications may be made thereto. For example, in other embodiments, the number of low-band, mid-band and high-band arrays may be varied from what is shown (including omitting certain types of arrays), as may the number of radiating elements included in each array. Likewise, different arrays may span the two base station antennas and/or the arrays may be arranged differently from what is shown. While the radiating elements are illustrated as being dual-polarized radiating elements in the depicted embodiment, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

As discussed above, linear arrays 240-1, 240-2 span both the first and second base station antennas 200, 300, and hence RF connections 110 are provided between the first and second base station antennas 200, 300 in the form of coaxial jumper cables 280 on the first base station antenna 200 and RF connector ports 360 on the second base station antenna 300. FIGS. 5-12 illustrate one example embodiment of these RF connections 110 and associated structures that protect these RF connections 110 from the elements.

Figure 5:
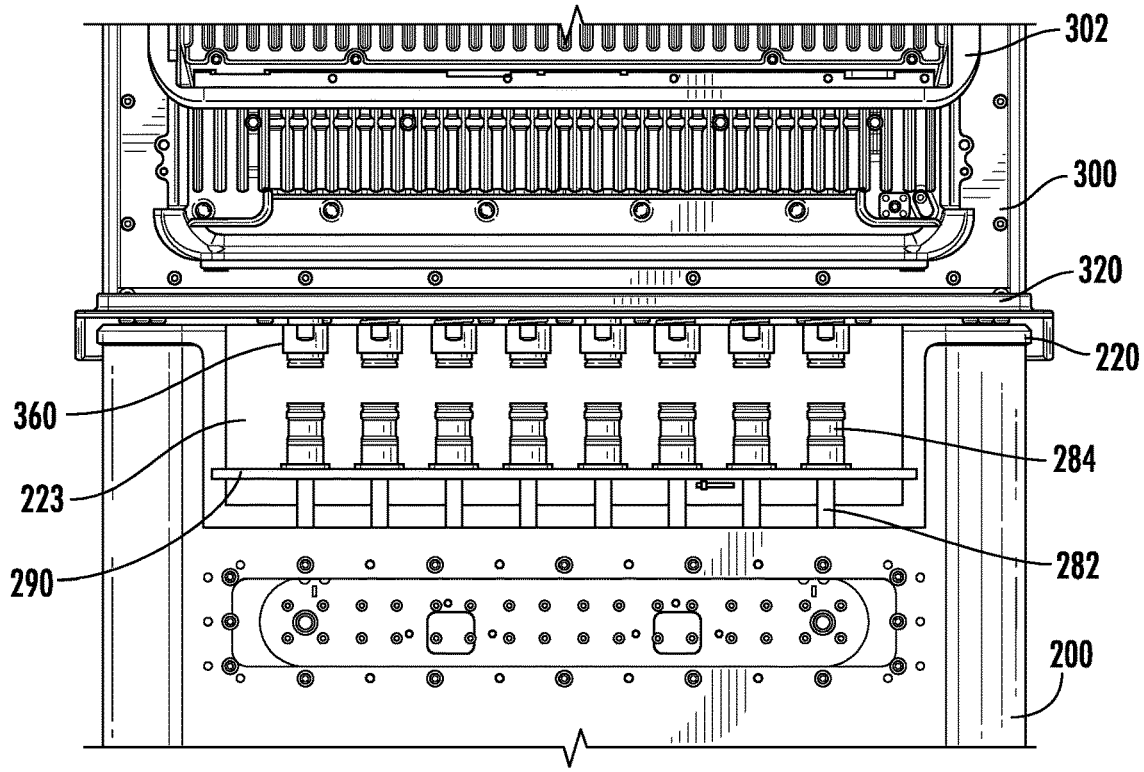
FIG. 5 is an enlarged partial rear view of the base station antenna unit of FIG. 1 with the connector ports on the two antennas in an unconnected state.
Figure 6:
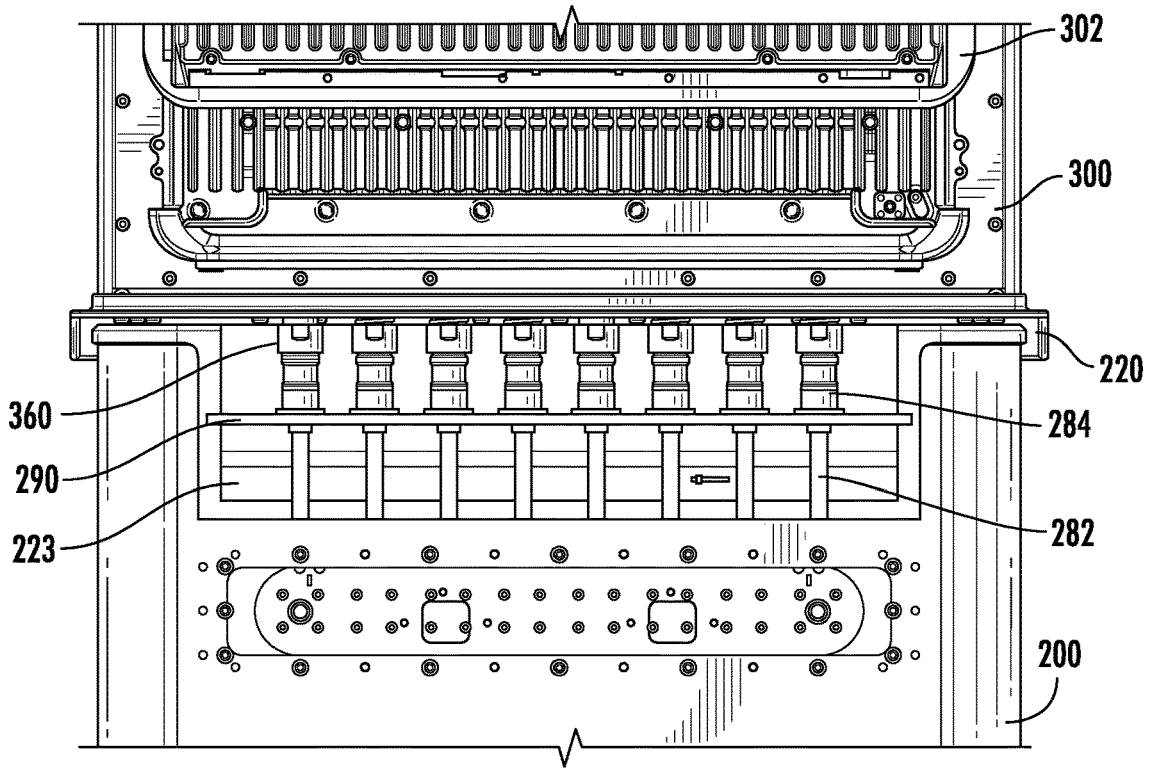
FIG. 6 is an enlarged partial rear view of the base station antenna unit of FIG. 1 with the connector ports on the two antennas in a connected state.
Figure 7:
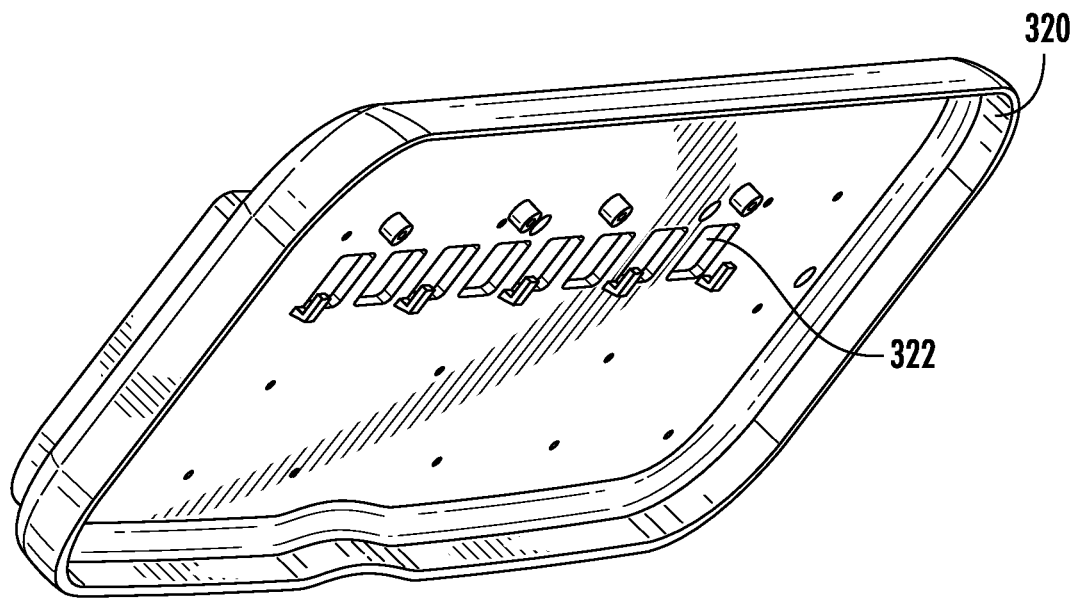
FIG. 7 is a perspective view of a bottom end cap of the upper base station antenna included in the base station antenna unit of FIG. 1.

FIGS. 5 and 6 are enlarged partial rear views of the antenna unit 100 that illustrate the interface between the first base station antenna 200 and the second base station antenna 300. As shown in FIGS. 5-6, the second base station antenna 300 may be mounted directly on top of the first base station antenna 200. The bottom end cap 320 of the second base station antenna 300 includes a plurality of connector ports 360 mounted therein. Each connector port 360 may extend along a respective longitudinal axis. In the depicted embodiment, all of these longitudinal axes extend in the vertical direction. FIG. 7 is a perspective view of the bottom end cap 320 of the second base station antenna 300. As can be seen, the bottom end cap 320 may have a conventional design and includes eight openings 322 that receive the respective RF connectors 360.

Figure 8:
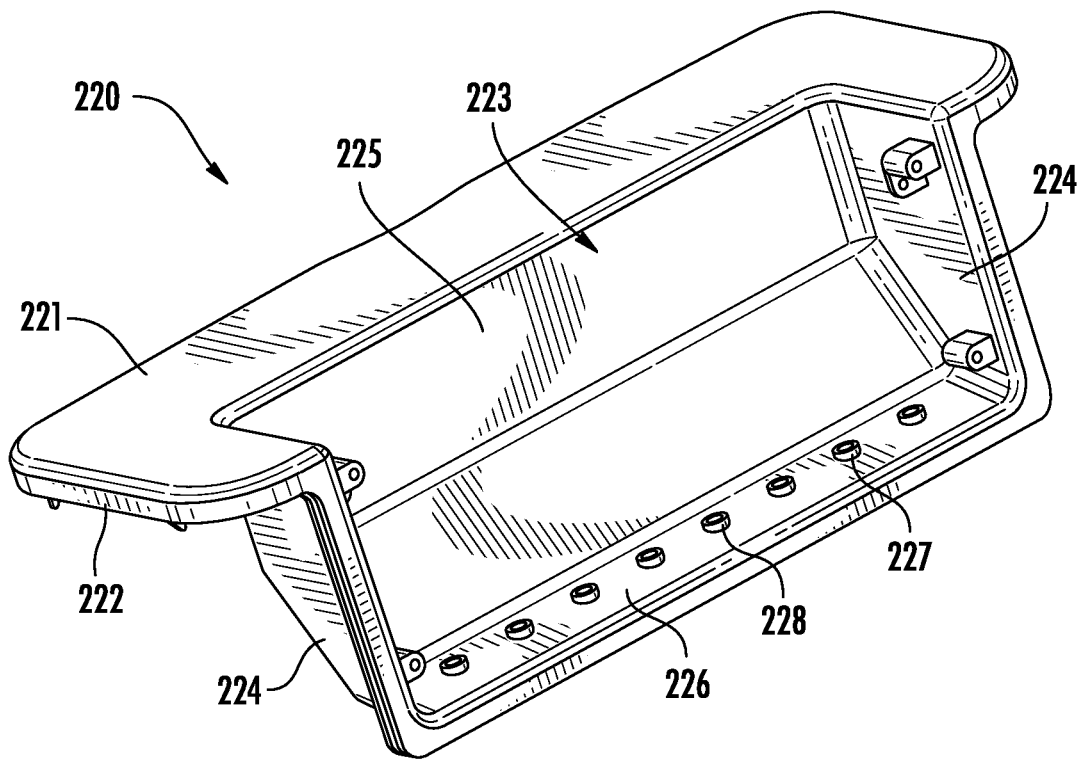
FIG. 8 is a perspective view of a top end cap of the lower base station antenna included in the base station antenna unit of FIG. 1.
Figure 9:
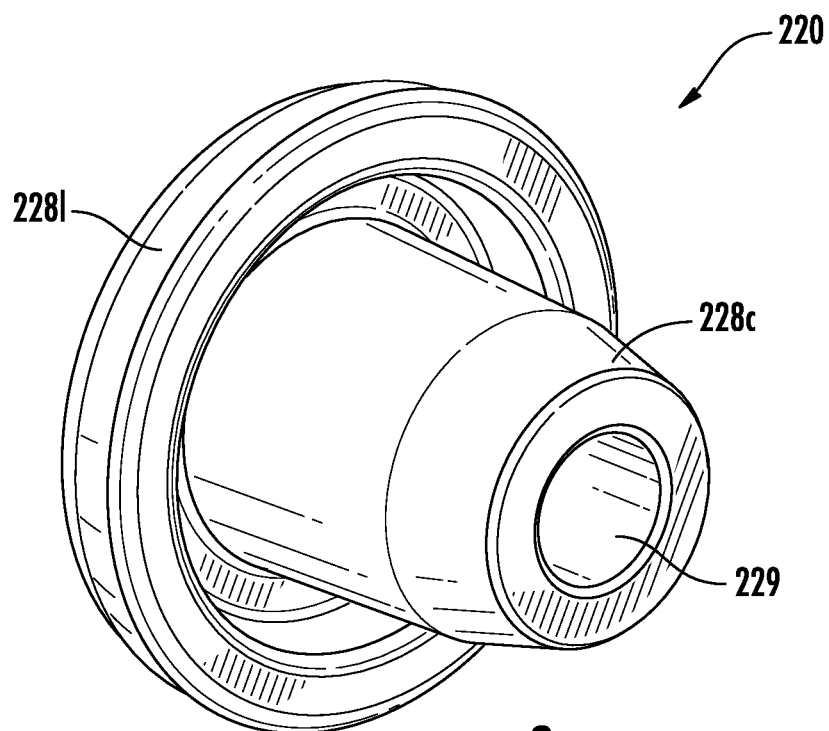
FIG. 9 is a perspective view of one of the rubber seals included in the top end cap of FIG. 8.

FIG. 8 is a perspective view of the top end cap 220 of the first base station antenna 200. As shown in FIG. 8, the top end cap 220 may have a non-conventional design. In particular, top end cap 220 has a planar top surface 221 with a downwardly extending lip 222. The planar top surface 221 is recessed to form a compartment 223 that is defined between a pair of side walls 224, a front wall 225 and a floor 226. The rear of the compartment 223 may be left open to allow access to the interior of the compartment 223. A plurality of openings 227 are formed in the floor 226 of compartment 223. Rubber seals 228 that each include an access hole 229 are mounted in the respective openings 227. FIG. 9 is an enlarged perspective view of one of the rubber seals 228. As shown in FIG. 9, each rubber seal 228 includes a downwardly protruding column 228c that is received within one of the openings 227 in the floor 226 of the compartment 223 in the top end cap 220. The top portion of rubber seal 228 takes the form of a raised lip 228*l* that raises the upper part of access hole 229 above the floor 226 of compartment 223. As such, even if a small amount of water gains access to compartment 223 and pools on the floor 226, the raised lip 228*l* may prevent the water from entering into the access hole 229.

In some embodiments, the openings 227 in the floor 226 of compartment 223 may be angled with respect to the vertical. This angling may be useful when retractable jumper cables 280 are used, as the angle may help initiate the bending of the cables 282 that occurs when the cables 292 are retracted backwardly into the antenna 200.

Figure 10:
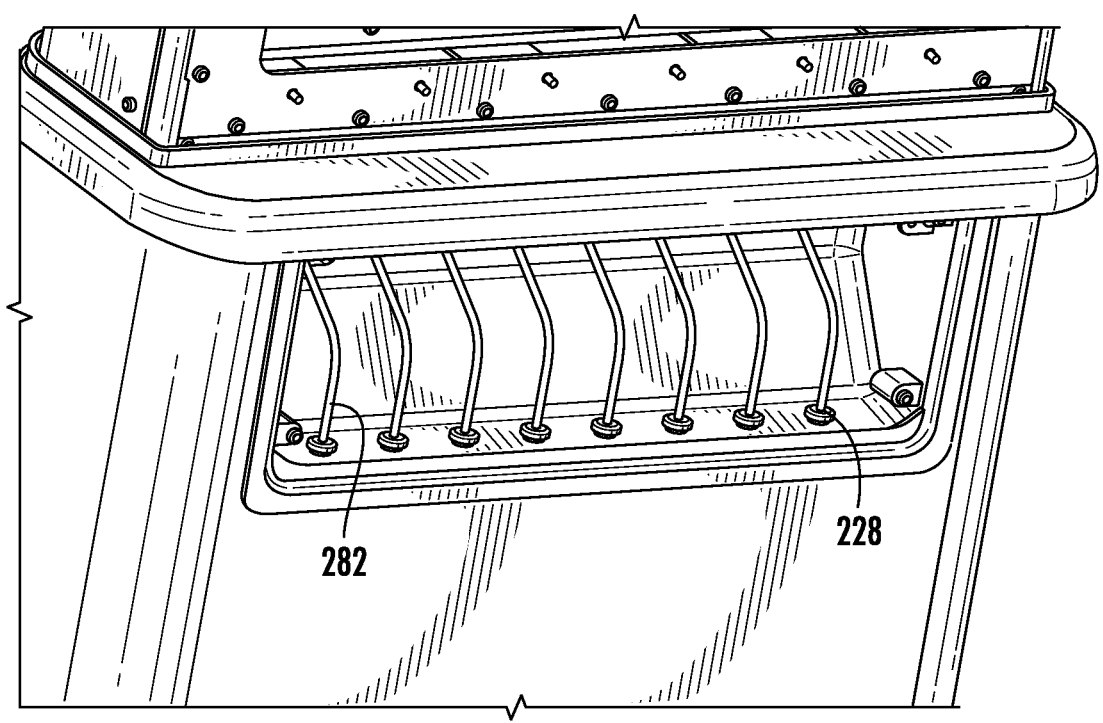
FIG. 10 is another enlarged partial rear view of the base station antenna unit of FIG. 1.

Referring to FIGS. 5 and 10, it can be seen that the cables 282 of the coaxial jumper cables 280 are routed through the rubber seals 228 in the respective openings 227 so that the RF connector ports 284 are external to the housing 210. In some embodiments, the RF connector ports 284 may be mounted in a common moveable connector support 290 that includes mounting locations for each RF connector port 284. In the depicted embodiment, the connector support 290 is implemented as a plastic plate that includes openings for each cable 282 and screw holes (not visible) that allow each RF connector port 284 to be mounted onto the connector support 290 via small screws. These mounting locations may be positioned so that each RF connector port 284 may be aligned with a respective one of the RF connector ports 360 in the bottom end cap 320 of the second base station antenna 300. The RF connector ports 284 may be push-in connector ports that are configured to mate with the respective RF connector ports 360. As shown in FIG. 6, the connector support 290 may be moved upwardly in order to mate each RF connector port 284 with a respective one of the RF connector ports 360 in order to implement the RF connections 110 between the first and second base station antennas 200, 300. One or more latches (not shown) or other locking mechanisms may be included that hold the connector support 290 in place in the position shown in FIG. 6. The connector support 290 allows an installer to connect all eight RF connector ports 284 to the mating RF connector ports 360 in a single operation, and also ensures that each RF connector port 284 is connected to its corresponding RF connector port 360 (i.e., misconnections are prevented).

In some embodiments, the coaxial jumper cables may be retractable jumper cables so that the cables 280 may move with respect to the openings 227 in the floor 226 of compartment 223. In embodiments where the jumper cables 280 are retractable jumper cables 280, the cables 282 may be still be fixed to the housing 210 or other internal structures of the first base station antenna 200 to ensure that an installer cannot pull the cables 282 to far out of the antenna 200 such that the internal ends of one or more of the cables 282 are pulled loose from the structures that they are connected to. In many cases, the internal end of each jumper cable 280 may be soldered to an output port on a phase shifter 274, and fixing the cables 282 internally so that force cannot be transferred to these solder joints may help maintain the integrity of the solder joints.

Figure 13:
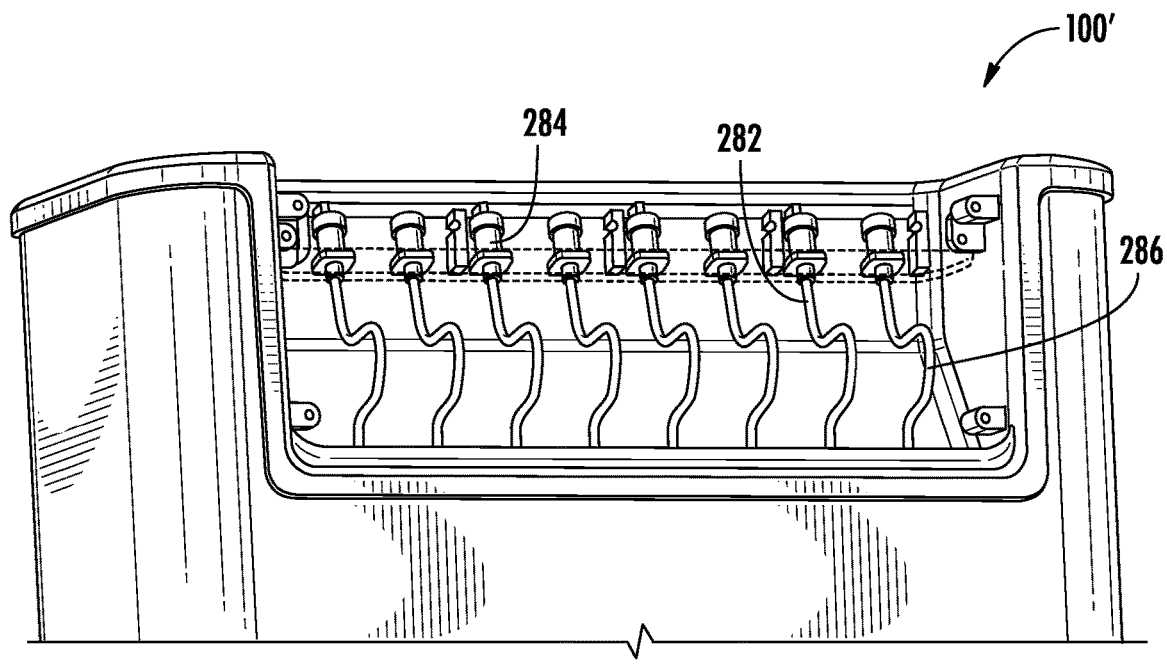
FIGS. 13 and 14 are enlarged partial rear views of a base station antenna unit that is similar to the base station antenna unit of FIG. 1 except that the jumper cables are non-retractable.
Figure 14:
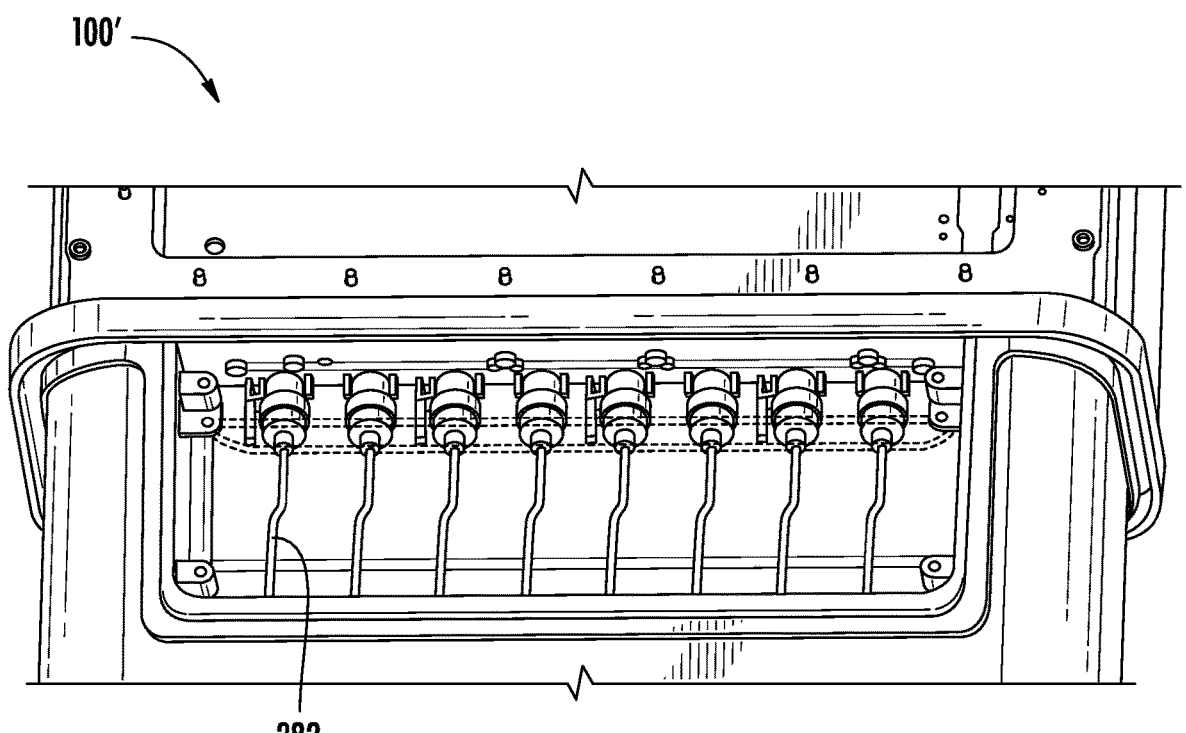

In other embodiments, the cables 280 may be fixed to the housing 210 so that a pre-selected length of each cable 282 extends through the openings 227 in the top end cap 220. This pre-selected length may include sufficient slack so that the connector support 290 may be moved from the position shown in FIG. 5 to the position shown in FIG. 6. FIGS. 13 and 14 are enlarged partial rear views of a base station antenna unit 100' that is similar to the base station antenna unit 100 except that the jumper cables 280 are non-retractable jumper cables. As shown in FIG. 13, when the RF connector ports 284 are in a disconnected state, slack loops 286 may appear in the cables 282. As shown in FIG. 14, when the jumper cables 280 are fully extended so that the RF connector ports 284 thereof mate with the corresponding RF connector ports 360 on the second base station antenna 300, the slack loops 286 may substantially disappear.

Figure 11:
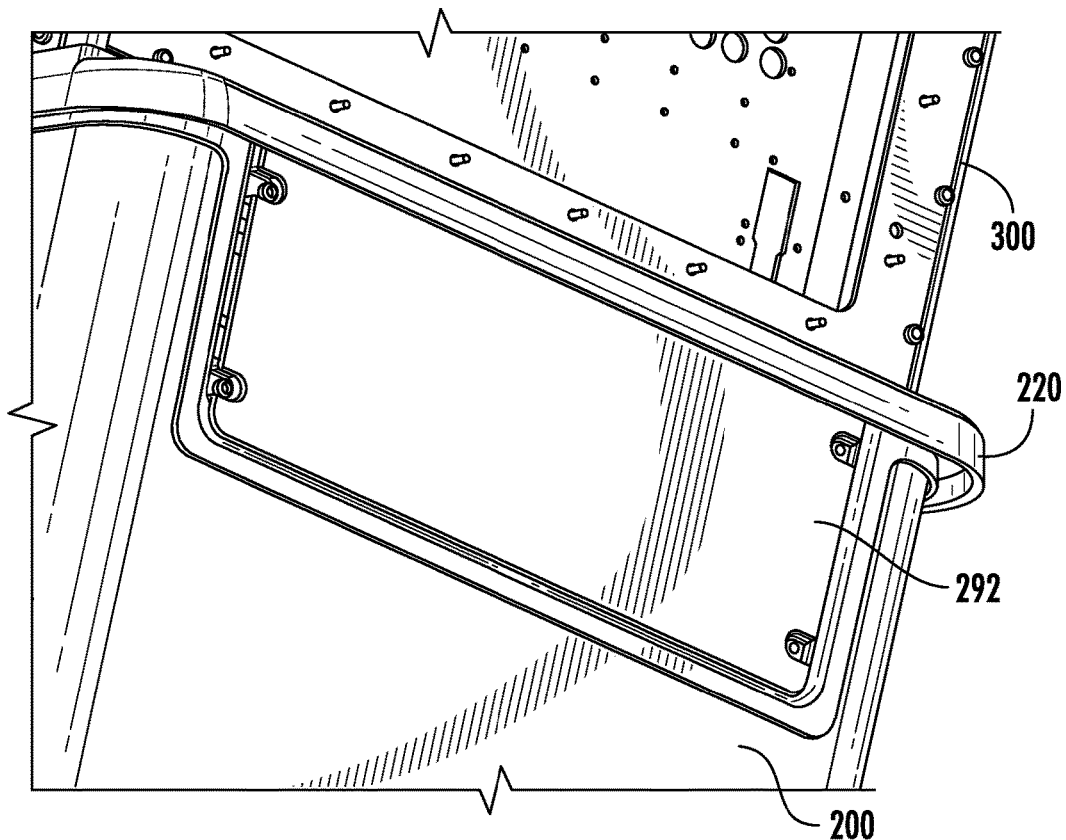
FIG. 11 is an enlarged partial rear view of the base station antenna unit of FIG. 1 with a cover for the top end cap of the lower base station antenna in place.
Figure 12:
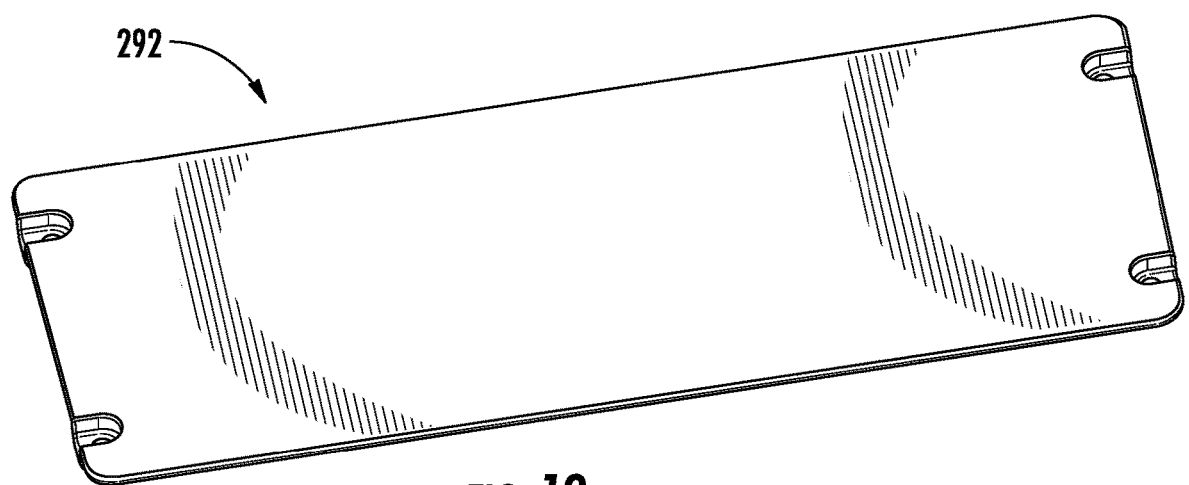
FIG. 12 is a perspective view of the cover of FIG. 11.

Referring to FIGS. 11 and 12, a cover 292 may be provided that forms a rear wall for the compartment 223. The cover 292 may be a separate removable cover, a hinged cover, a sliding cover or the like. The cover 292 may protect the RF connections 110 from the elements and may also reduce or prevent the ingress of water into the compartment 223. While not shown in the drawings, a seal such as a rubber gasket may also be provided between the bottom end cap 320 of the second base station antenna 300 and the top end cap 220 of the first base station antenna 200.

The above-described design of the RF connections 110 between the first and second base station antennas 200, 300 may have a number of advantages. First, the RF connector ports 360 extend downwardly from the bottom end cap 320 of the second base station antenna 300. This design helps protect the second base station antenna 300 from water ingress through the RF connector ports 360 and may shield the RF connector ports 360 from rain. Second, by mounting the RF connector ports 284, 360 on the respective top and bottom end caps, the length of the RF connections 110 between the first and second base station antennas 200, 300 can be kept very short, which reduces the insertion losses along the RF connections. Since the array 350 operates at high frequencies, insertion losses can be quite high, and hence having short RF connections can provide a significant performance improvement (e.g., as much as a 2-3 dB improvement in insertion loss). Third, by mounting the RF connector ports 284 in a common connector support 290 and implementing the RF connector ports 284, 360 using push-in connectors, an installer can readily make all eight RF connections 110 in a single operation and can do so without misconnections. Fourth, the cover 292 may protect the RF connector ports 284, 360 and may shield the RF connections 110 from view.

It will be appreciated that the present invention may be modified in many different ways. For example, in some embodiments, the top end cap 220 of the first base station antenna 200 may be used instead (with appropriate modifications) as the bottom end cap of the second base station antenna 300, and the bottom end cap 320 of the second base station antenna 300 may be used (with appropriate modifications) as the top end cap of the first base station antenna 200. In such embodiments, the RF connector ports 360 would be mounted in the top end cap of the first base station antenna 200 and the coaxial jumper cables 280 would be mounted in the bottom end cap of the second base station antenna 300. Such embodiments are fully within the scope of the present invention.

In some situations, it may be advantageous to have additional antenna arrays that extend between the first antenna and the second antenna of the base station antenna units according to embodiments of the present invention. As discussed above, in some example embodiments of the present invention, two low-band arrays 240-1, 240-2 span both the first and second antennas 200, 300. For example, as shown in FIGS. 3-4, in one embodiment, four phase cable connections extend between the first and second antennas 200, 300 for low-band array 240-1, namely a first phase cable connection for the +45° dipole radiators of radiating elements 242-6 and 242-7, a second phase cable connection for the +45° dipole radiator of radiating element 242-8, a third phase cable connection for the −45° dipole radiators of radiating elements 242-6 and 242-7, and a fourth phase cable connection for the −45° dipole radiator of radiating element 242-8. A phase cable connection refers to a connection between an output of a phase shifter/power divider and one or more radiating elements. Four additional phase cable connections similarly extend between the first and second antennas 200, 300 for low-band array 240-2. Thus, a total of eight RF connections are provided between the first and second antennas 200, 300 in the base station antenna unit 100 of FIGS. 3-4.

Due to space constraints, it may be difficult to include substantially more than eight RF connections between the first and second antennas 200, 300 in some base station antenna designs. Reducing the number of RF connections between the first and second antennas 200, 300 may also be desirable as it reduces the chance for connection errors. However, applications exist where it would be beneficial to have additional arrays span the first and second antennas 200, 300 such as, for example, having some or all of the mid-band arrays 250-1 through 250-4 that are included in base station antenna unit 100 span both the first and second antennas 200, 300.

Pursuant to further embodiments of the present invention, diplexers (note that the term "diplexer" is used broadly herein to encompass devices that filter/combine signals across two or more frequency bands, and hence encompasses, for example, triplexers) may be added to both the first and second antennas 200, 300 in order to allow the RF connections 110 that extend between the two antennas 200, 300 to carry, for example, both low-band and mid-band RF signals. In this way, the RF connections 110 may be used to pass both low-band and mid-band RF signals between the first and second antennas 200, 300, thereby effectively doubling the number of actual RF transmission paths without increasing the number of RF connections 110.

Figure 15A:
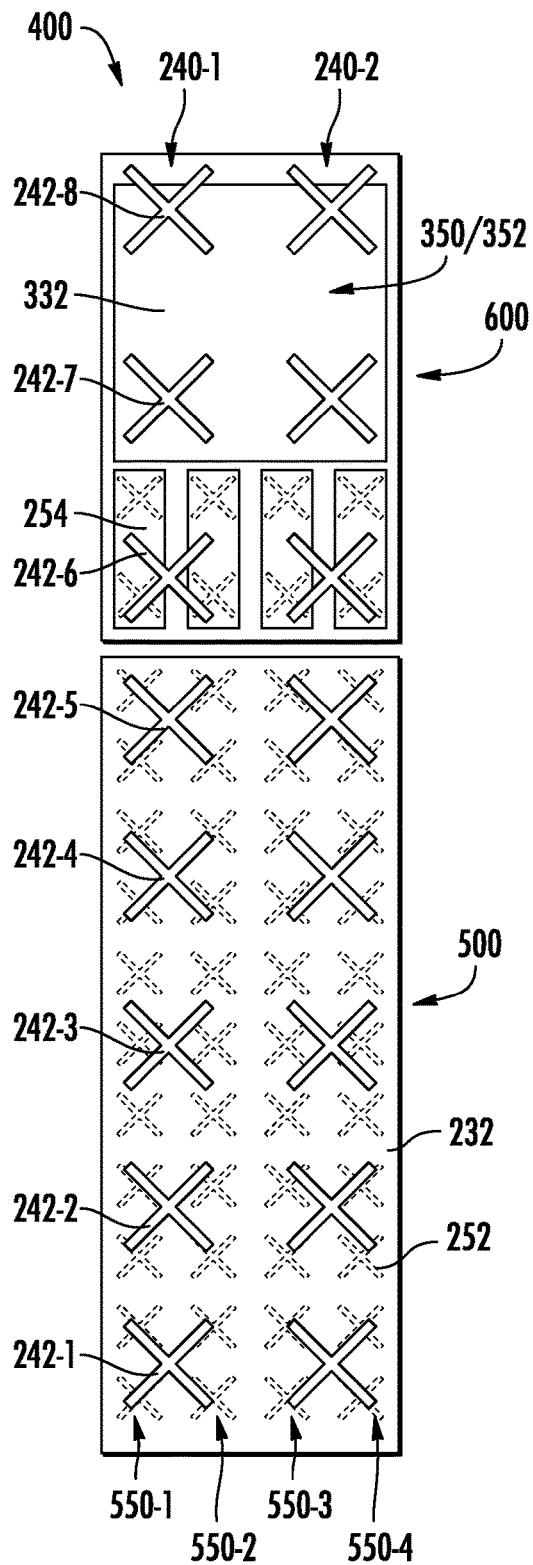
FIG. 15A is a schematic front view of a base station antenna unit according to embodiments of the present invention that includes diplexed connections between the first and second antennas.

FIG. 15A is a schematic front view of a base station antenna unit 400 according to embodiments of the present invention (with the radome removed) that includes such a design. As shown in FIG. 15A, the base station antenna unit 400 is similar to the base station antenna unit 100 that is discussed above with reference to FIGS. 1-14. In particular, the base station antenna unit 400 includes a first base station antenna 500 and a second base station antenna 600. The antenna assembly of the first base station antenna 500 includes a backplane 232 that may serve at least as a ground plane and reflector for the radiating elements mounted thereon. The first base station antenna 500 also includes portions of two linear arrays 240-1, 240-2 of low-band radiating elements 242 that may be identical to the like-numbered arrays 240 of low-band radiating elements 242 that are included in base station antenna unit 100, and hence further description thereof will be omitted. The low-band radiating elements 242 may be mounted on feed boards (not shown in FIG. 15A) in the exact same manner as discussed above with reference to the feed boards 244 of FIG. 3. The first base station antenna 500 further includes portions of four linear arrays 550-1 through 550-4 of mid-band radiating elements 252. The mid-band radiating elements 252 are mounted to extend forwardly from the backplane 232. The mid-band linear arrays 550-1 through 550-4 are similar to the mid-band linear arrays 250-1 through 250-4 that are included in base station antenna unit 100, discussed above, except that mid-band linear arrays 550-1 through 550-4 each include two additional mid-band radiating elements 252 that are included in the second base station antenna 600. In other words, base station antenna unit 400 differs from base station antenna unit 100 in that the four linear arrays 550-1 through 550-4 of mid-band radiating elements 252 each span both the first and second antennas 500, 600 in base station antenna unit 400. Otherwise, the four linear arrays 550-1 through 550-4 of mid-band radiating elements 252 may be identical to the four linear arrays 250-1 through 250-4 of mid-band radiating elements 252 discussed above with reference to base station antenna unit 100.

The second base station antenna 600 includes a main backplane 332 that serves at least as a ground plane and reflector for the radiating elements mounted thereon. As is shown in FIG. 15A, the second base station antenna 600 includes the remaining portions of the two linear arrays 240-1, 240-2 of low-band radiating elements 242, the remaining portions of the four linear arrays 550-1 through 550-4 of mid-band radiating elements 252, and a planar, eight-column array 350 of high-band radiating elements 352. The planar, eight-column array 350 of high-band radiating elements 352 may be identical to the like-numbered high-band array 350 included in base station antenna unit 100, and hence further description thereof will be omitted.

The eight-column array 350 of high-band radiating elements 352 is shown schematically as a box in FIG. 15A in order to simplify the drawing.

Each low-band linear array 240-1, 240-2 of low-band radiating elements 242 extends across or "spans" both the first base station antenna 500 and the second base station antenna 600, and each mid-band linear array 550-1 through 550-4 of mid-band radiating elements 252 likewise spans both the first base station antenna 500 and the second base station antenna 600. A total of two mid-band radiating elements 252 of each linear array 550-1 through 550-4 are included in the second base station antenna 600, and in each linear array 550 both radiating elements 252 are mounted on a common feed board 254 and are configured to both be fed by common feed signals. Accordingly, a total of eight RF connections are needed between the first base station antenna 500 and the second base station antenna 600 to pass RF signals to and from the mid-band radiating elements 252, namely one RF connection for each of the four mid-band arrays 550 for each of two polarizations.

In base station antenna unit 400, a total of eight RF connections 110 are provided between the first base station antenna 500 and the second base station antenna 600, yet a total of sixteen RF connections are required (eight for the low-band arrays 240 and eight for the mid-band arrays 550). In order to implement sixteen RF connections over the eight physical RF connections 110, pursuant to embodiments of the present invention, each RF connection is diplexed so that it may act as both a low-band RF transmission path and as a mid-band RF transmission path. This is shown in more detail with reference to FIG. 15B, which is a schematic block diagram depicting certain of the elements of the base station antenna unit 400.

Figure 15B:
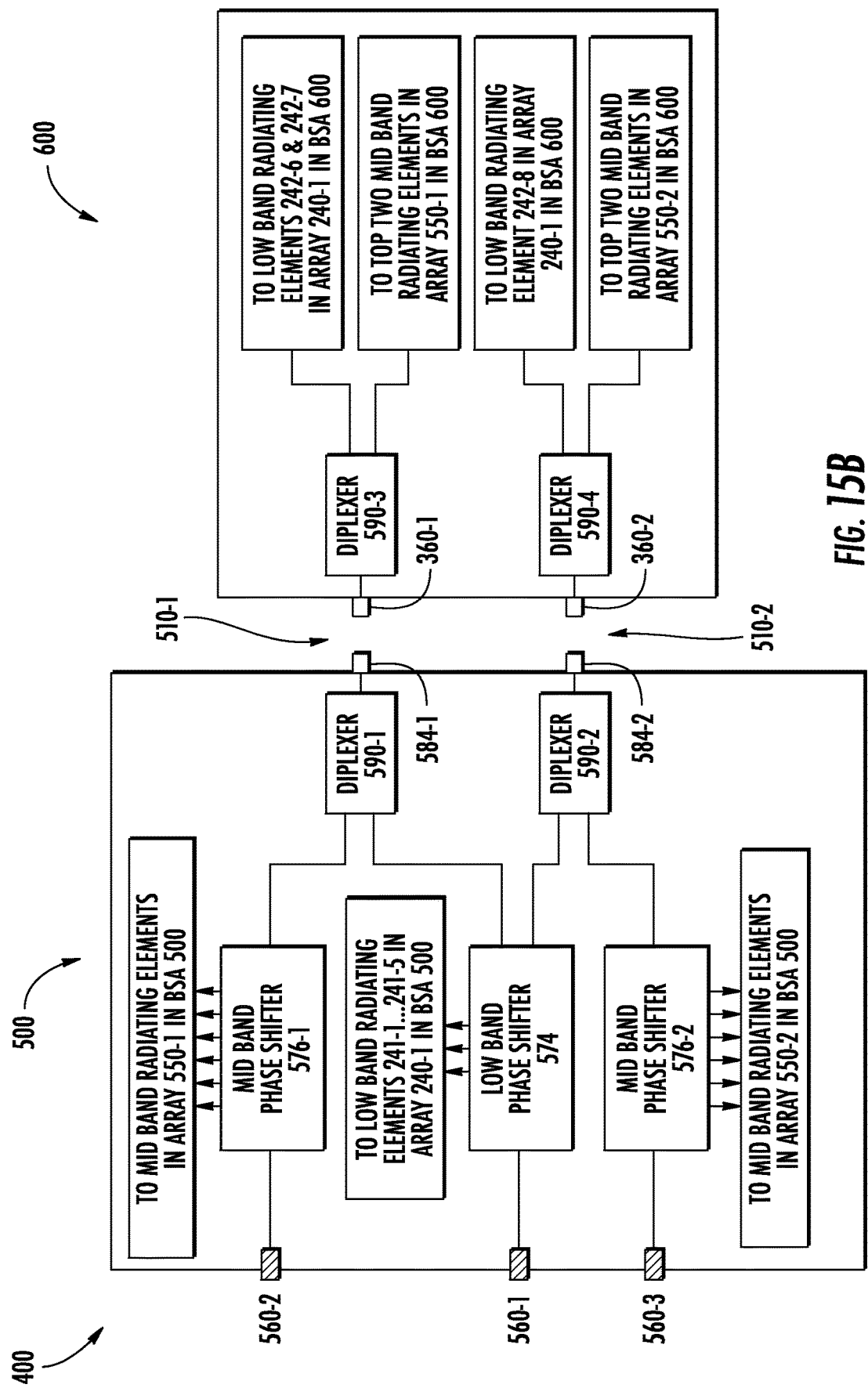
FIG. 15B is a schematic block diagram that illustrates two of the RF connections between the first and second base station antennas of the base station antenna unit of FIG. 15A.

As shown in FIG. 15B, the phase shifters 574 for the low-band arrays 240-1, 240-2 and the phase shifters 576 for the mid-band arrays 550-1 through 550-4 are mounted in the first base station antenna 500. While only one low-band phase shifter 574 and two mid-band phase shifters 576 are shown in FIG. 15B, it will be appreciated that a total of four low-band phase shifters 574 and eight mid-band phase shifters 576 may be provided, namely two phase shifters 574 (one for each polarization) for each low-band array 240 and two phase shifters 576 for each mid-band linear array 550.

A first RF port 560-1 on the first base station antenna 500 is coupled to an input port of the low-band phase shifter 574. The low-band phase shifter 574 may split RF signals input thereto into a plurality of sub-components, and may apply a phase taper to the sub-components in order to electrically change the elevation or "tilt" angle of the antenna beam generated by low-band linear array 240-1, in a manner well understood by those of skill in the art. In the depicted embodiment, the low-band phase shifter 574 divides RF signals input thereto from the first RF port 560-1 into five sub-components that are output at the respective five outputs of the low-band phase shifter 574. As shown in FIG. 15B, three of the outputs of low-band phase shifter 574 are coupled to low-band radiating elements 242 of the first low-band array 240-1 that are mounted in base station antenna 500, in the exact same manner as is shown in FIG. 4 above. As is further shown in FIG. 15B, the fourth output of low-band phase shifter 574 is connected to a first frequency selective port of a first diplexer 590-1 that is mounted in the first base station antenna 500 and the fifth output of low-band phase shifter 574 is connected to a first frequency selective port of a second diplexer 590-2 that is mounted in the first base station antenna 500.

A second RF port 560-2 included on the first base station antenna 500 is coupled to an input port of the first mid-band phase shifter 576-1. The first mid-band phase shifter 576-1 may split RF signals input thereto into a plurality of sub-components, and may apply a phase taper to the sub-components in order to electrically change the elevation or "tilt" angle of the antenna beam generated by mid-band linear array 550-1. In the depicted embodiment, the first mid-band phase shifter 576-1 divides RF signals input thereto into seven sub-components that are output at the respective seven outputs of the phase shifter 576-1. Six of the outputs may be coupled to the twelve mid-band radiating elements 252 in the first mid-band array 550-1 (each output feeds two mid-band radiating elements 252). The seventh output is connected to a second frequency selective port of the first diplexer 590-1.

A third RF port 560-3 on the first base station antenna 500 is coupled to an input port of the second mid-band phase shifter 576-2. The second mid-band phase shifter 576-2 may split RF signals input thereto into a plurality of sub-components, and may apply a phase taper to the sub-components in order to electrically change the elevation or "tilt" angle of the antenna beam generated by mid-band linear array 550-2. In the depicted embodiment, the second mid-band phase shifter 576-2 divides RF signals input thereto into seven sub-components that are output at the respective seven outputs of the phase shifter 576-2. Six of the outputs are coupled to the twelve mid-band radiating elements 252 in the second mid-band array 550-2 (each output feeds two mid-band radiating elements 252). The seventh output is connected to a second frequency selective port of the second diplexer 590-2.

The common port of the first diplexer 590-1 is coupled to a first RF connector port 584-1 and the common port of the second diplexer 590-2 is coupled to a second RF connector port 584-2. A first coaxial jumper cable (not shown) connects the first RF connector port 584-1 to a first RF connector port 360-1 on the second base station antenna 600, and a second coaxial jumper cable (not shown) connects the second RF connector port 584-2 to a second RF connector port 360-2 on the second base station antenna 600. The coaxial jumper cables may be any of the coaxial jumper cables disclosed herein, including the retractable coaxial jumper cables that include the connector ports 584 that are described, for example, with reference to FIGS. 5-6. The first RF connector port 360-1 on base station antenna 600 is coupled to the common port of a third diplexer 590-3, and the second RF connector port 360-2 on base station antenna 600 is coupled to the common port of a fourth diplexer 590-4.

A first frequency selective port on the third diplexer 590-3 is coupled to low-band radiating elements 242-6 and 242-7, which are part of the first low-band array 240-1, and which are mounted in the second base station antenna 600. A second frequency selective port on the third diplexer 590-3 is coupled to the two mid-band radiating elements 252 that are part of the first mid-band array 550-1 that are mounted in the second base station antenna 600. Similarly, a first frequency selective port on the fourth diplexer 590-4 is coupled to the remaining low-band radiating element 242-8 in the first low-band array, and a second frequency selective port on the fourth diplexer 590-4 is coupled to the two mid-band radiating elements 252 that are part of the second mid-band array 550-2 that are mounted in the second base station antenna 600.

The first and third diplexers 590-1, 590-3 allow both a low-band RF signal and a mid-band RF signal to be simultaneously transmitted from the first base station antenna 500 to the second base station antenna 600 (or vice versa) through RF connection 510-1. Similarly, the second and fourth diplexers 590-2, 590-4 allow both a low-band RF signal and a mid-band RF signal to be simultaneously transmitted from the first base station antenna 500 to the second base station antenna 600 (or vice versa) through a single RF connection 510-2. Thus, the diplexers 590 allow the mid-band arrays 550 to span both antennas 500, 600 by sharing the RF connections 510 with the low-band arrays 240.

Figure 16A:
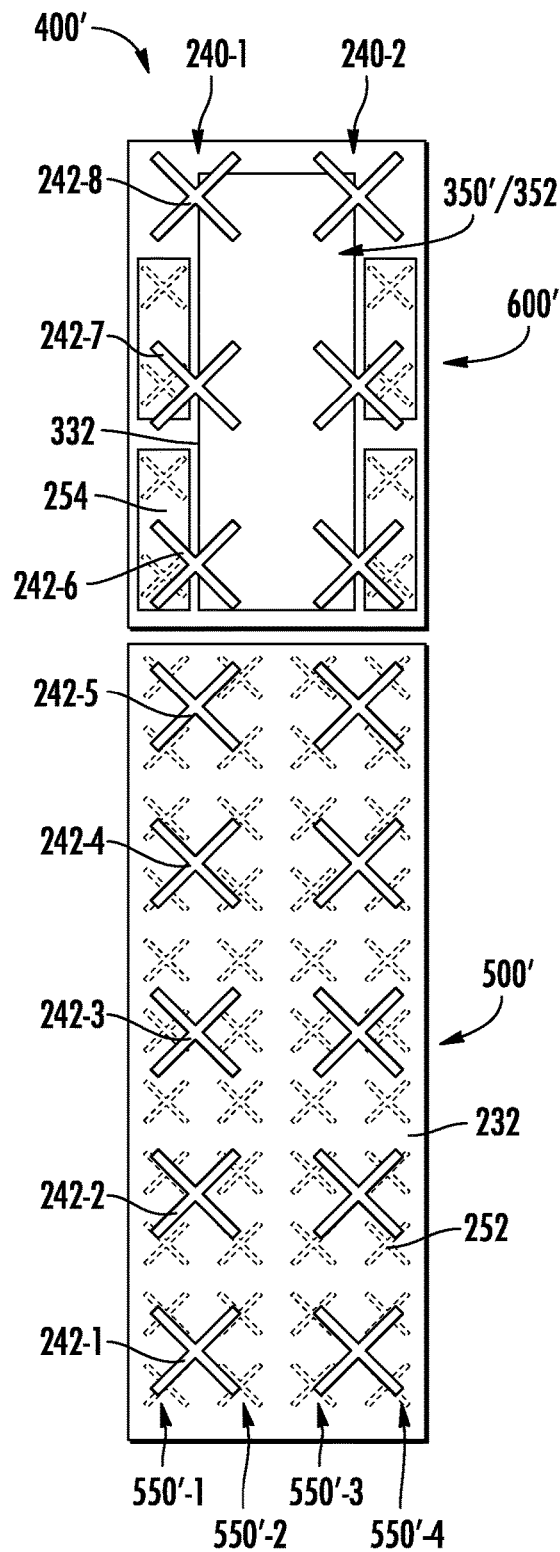
FIG. 16A is a schematic front view of a base station antenna unit that is a modified version of the base station antenna unit of FIG. 15A.

FIG. 16A is a schematic front view of a base station antenna unit 400' that is a modified version of the base station antenna unit 400 of FIG. 15A. The base station antenna unit 400' is very similar to the base station antenna unit 400 of FIG. 15A, and hence the discussion below focuses on the differences between the two base station antenna units 400, 400'.

As can be seen by comparing FIGS. 15A and 16A, the base station antenna unit 400' differs from base station antenna unit 400 in that only two of the mid-band arrays 550 span the first and second base station antennas 500', 600', whereas all four mid-band arrays 550 span the first and second base station antennas 500, 600 in base station antenna unit 400. Additionally, in the mid-band linear arrays 550' that are included in base station antenna unit 400', four mid-band radiating elements 252 are mounted in the second base station antenna 600' for mid-band linear arrays 550'-1 and 550'-4, as opposed to only two mid-band radiating elements 252 as is the case in base station antenna unit 400. Each pair of mid-band radiating elements 252 in the second base station antenna 600' are fed by a first of the RF connections 510 for first polarization signals and by a second of the of the RF connections 510 for second polarization signals. Thus, a total of eight RF connections are required between the first base station antenna 500' and the second base station antenna 600' for the mid-band linear arrays 550. As with the embodiment of FIGS. 15A-15B, this is achieved by using diplexed connections 510' that carry both low-band and mid-band RF signals. Finally, base station antenna unit 400' includes a four column high-band array 350' as opposed to the eight column high-band array 350 included in base station antenna unit 400 in order to make room for the additional mid-band radiating elements 252 that extend closer to the top of the base station antenna unit 400' in the second base station antenna 600'.

Figure 16B:
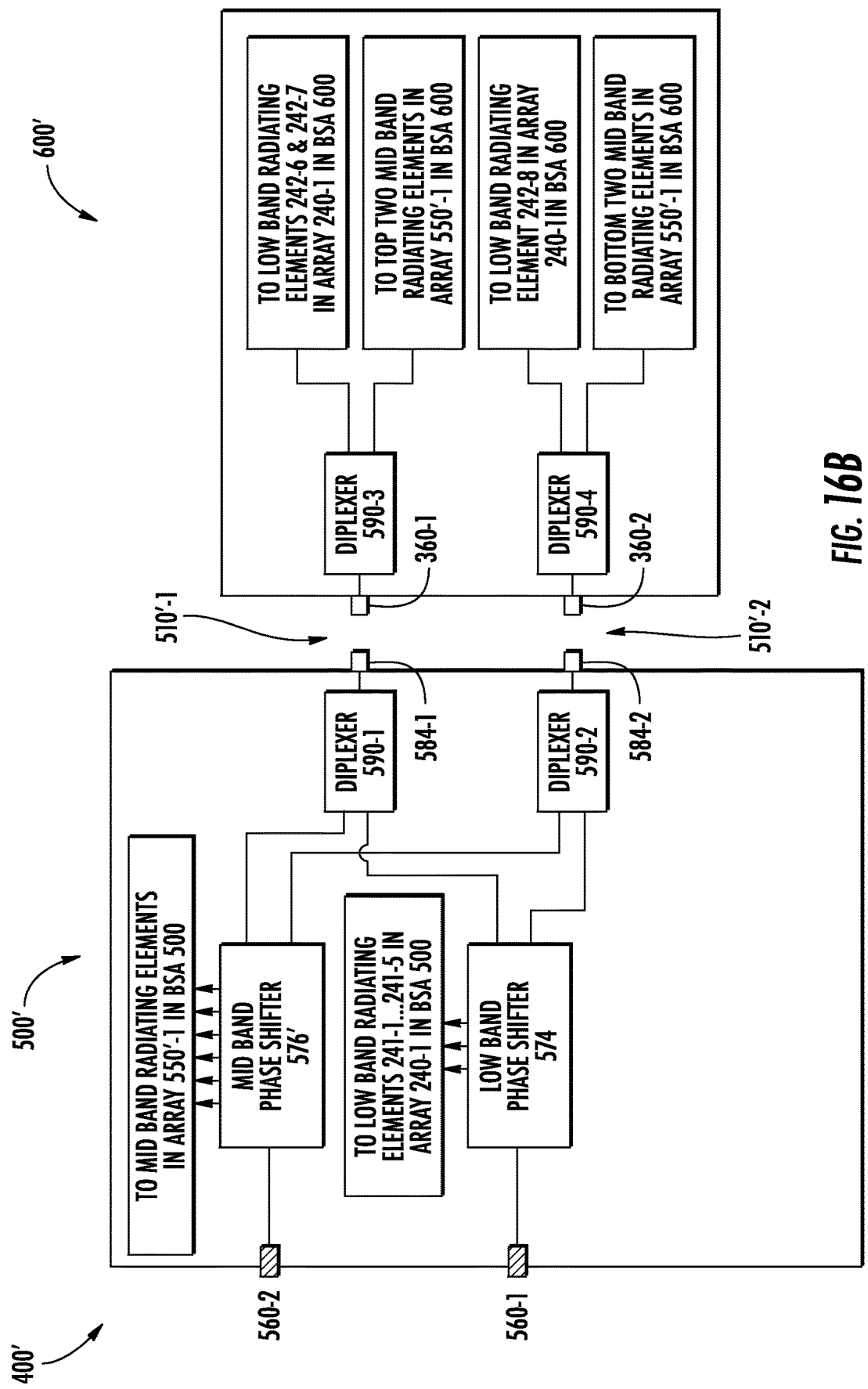
FIG. 16B is a schematic block diagram that illustrates two of the RF connections between the first and second base station antennas of the base station antenna unit of FIG. 16A.

FIG. 16B is a schematic block diagram illustrating the diplexed connections 510' that may be used to pass low-band and mid-band RF signals (for one of the two polarizations) to the low-band radiating elements 242 and to the mid-band radiating elements 252 of linear arrays 240-1 and 550'-1 that are mounted in the second base station antenna 600' of the base station antenna unit 400' of FIG. 16A. The circuit shown in FIG. 16B would be replicated in base station antenna unit 400' in order to support linear arrays 240-2 and 550'-4 and these two circuits would then be replicated again to support the second polarization for each linear array 240-1, 240-2, 550'-1, 550'-4. As can be seen, the circuit of FIG. 16B is similar to the circuit of FIG. 15B, except that in the circuit of FIG. 16B only one mid-band phase shifter 576 feeds the diplexers 590 since low-band linear array 240-1 and mid-band linear array 550'-1 share the same two diplexers 590-1, 590-2 to pass two RF signals each to the second base station antenna 600'.

It should be noted that the 617-960 MHz low-band frequency band and the 1427-2690 MHz mid-band frequency band are fairly widely separated in frequency, and hence relatively low cost, microstrip printed circuit board based diplexers may be used in some embodiments to implement the diplexers 590 while still providing acceptable isolation, return loss and insertion loss performance.

Figure 17:
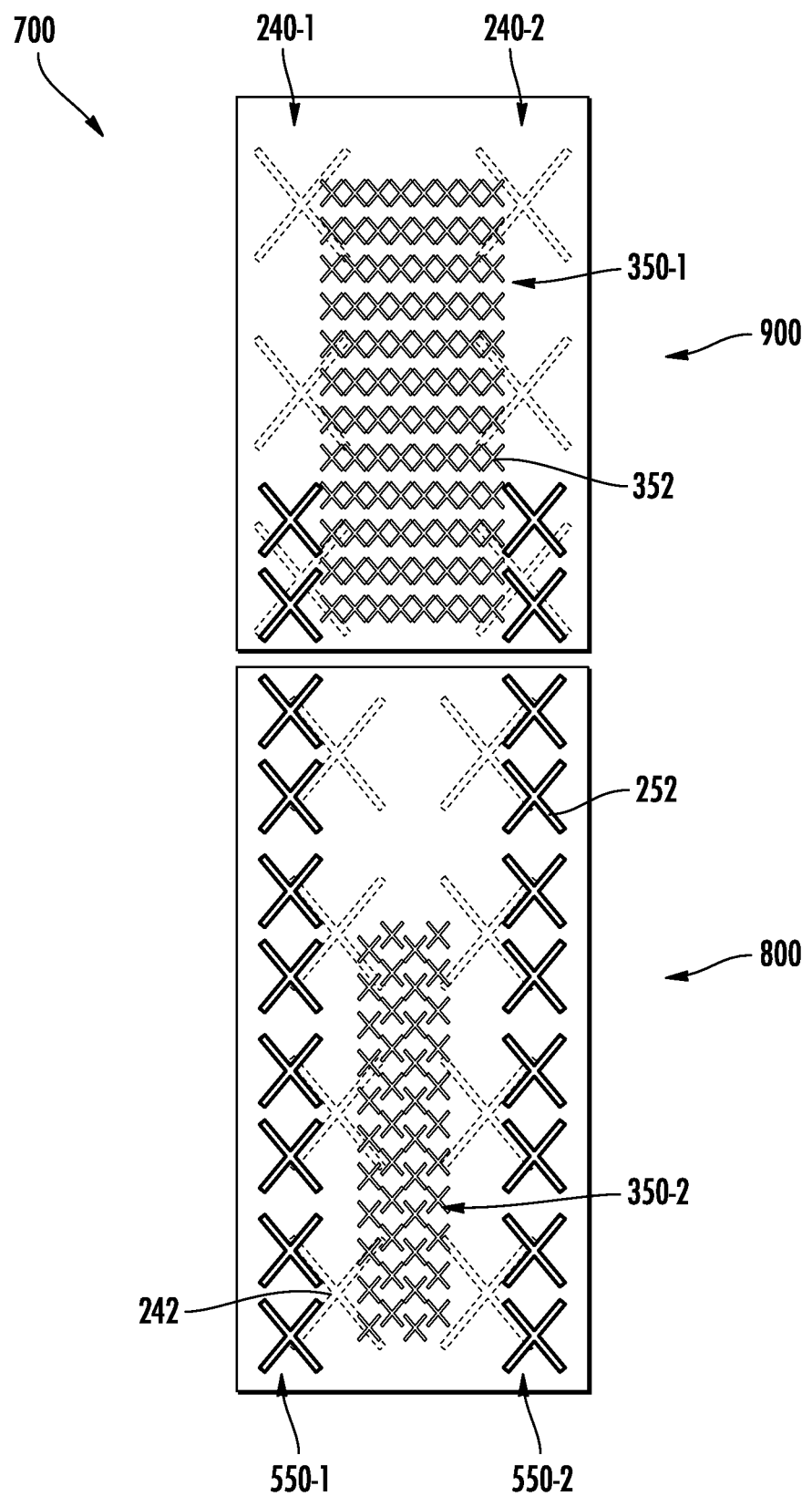
FIG. 17 is a schematic front view of a base station antenna unit according to still further embodiments of the present invention.

FIG. 17 is a schematic front view of a base station antenna unit 700 according to embodiments of the present invention that includes a first base station antenna 800 and a second base station antenna 900. As shown in FIG. 17, the base station antenna unit 700 includes first and second arrays 240-1, 240-2 of low-band radiating elements 242, first and second arrays 550-1, 550-2 of mid-band radiating elements 252, an eight column array 350-1 of high-band radiating elements 352, and a four column array 350-2 of high-band radiating elements 352. The low-band linear arrays 240 and the mid-band linear arrays 550 each span both the first and second base station antennas 800, 900. The low-band linear arrays 240-1, 240-2 and the mid-band linear arrays 550-1, 550-2 may be identical to the low-band linear arrays 240-1, 240-2 and the mid-band linear arrays 550-1, 550-4 that are included in base station antenna unit 400, and hence further description thereof will be omitted. Similarly, the high-band linear array 350-1 may be identical to the high-band linear arrays 350 included in base station antenna unit 400, and hence further description thereof will also be omitted. Thus, the primary difference between base station antenna unit 400 and base station antenna 700 is that two of the mid-band linear arrays 550-2, 550-3 included in base station antenna unit 400 are replaced in base station antenna unit 700 with the high-band linear array 350-2. The high-band linear array 350-2 may, for example, be a Citizens Band Radio Service array that is configured to operate in the 3550-3700 MHz frequency band in some embodiments.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna unit, comprising:
   a first base station antenna that comprises a first housing that includes a first radome and a top end cap;
   a second base station antenna that comprises a second housing that includes a second radome and a bottom end cap;
   a retractable jumper cable that includes a first connector port that is mounted in one of the top end cap or the bottom end cap, and
   a second connector port that is configured to mate with the first connector port, the second connector port mounted in the other one of the top end cap or the bottom end cap.

2. The base station antenna unit of claim 1, wherein the first and second base station antennas are mounted in a vertically stacked arrangement, and a bottom surface of the second base station antenna is within 1 inch of a top surface of the first base station antenna.

3. The base station antenna unit of claim 2, wherein a longitudinal axis of the first connector port extends in a vertical direction and a longitudinal axis of the second connector port extends in the vertical direction.

4. The base station antenna unit of claim 1, wherein the retractable jumper cable comprises one of a plurality of jumper cables, each of the plurality of retractable jumper cables including a respective cable and a respective first connector port, and the second connector port comprises one of a plurality of second connector ports, and each of the retractable jumper cables is configured to mate with a respective one of the second connector ports.

5. The base station antenna unit of claim 4, wherein each of the plurality of retractable jumper cables is mounted in either the top end cap or the bottom end cap, and each of the associated second connector ports is mounted in the other one of the top end cap or the bottom end cap.

6. The base station antenna unit of claim 4, wherein at least two of the first connector ports are mounted in a common connector support that is moveable between a disconnected position and a connected position.

7. The base station antenna unit of claim 4, wherein the top end cap includes a compartment that has a front wall and a pair of side walls, and wherein the plurality of retractable jumper cables are mounted in the compartment.

8. The base station antenna unit of claim 7, wherein the top end cap further includes a cover that forms a back wall of the compartment.

9. The base station antenna unit of claim 7, wherein the second connector ports extend into the compartment when the second base station antenna is vertically stacked on the first base station antenna.

10. The base station antenna unit of claim 4, wherein the cables of the retractable jumper cables are configured to retract inside one of the first housing and the second housing.

11. The base station antenna unit of claim 4, wherein the bottom end cap includes a compartment, and wherein the plurality of retractable jumper cables are mounted in the compartment.

12. The base station antenna unit of claim 1, wherein the first base station antenna further includes:
a first radio frequency ("RF") port;
a first array of radiating elements that are coupled to the first RF port;
a second RF port; and
a first portion of a second array of radiating elements that are connected to the second RF port, and
wherein the second base station antenna includes a second portion of the second array of radiating elements.

13. The base station antenna unit of claim 1, further comprising:
a first array of first frequency band radiating elements that spans the first base station antenna and the second base station antenna;
a first phase shifter that is connected to each of the first frequency band radiating elements in the first array;
a second array of second frequency band radiating elements that spans the first base station antenna and the second base station antenna; and
a second phase shifter that is connected to each of the second frequency band radiating elements in the second array.

14. The base station antenna unit of claim 13, further comprising a first diplexer in the first base station antenna and a second diplexer in the second base station antenna, wherein the first diplexer includes a first port that is coupled to the first phase shifter, a second port that is coupled to the second phase shifter, and a common port, and the second diplexer includes a first port that is coupled to at least one of the first frequency band radiating elements in the second base station antenna, a second port that is coupled to at least one of the second frequency band radiating elements in the second base station antenna, and a common port that is coupled to the common port of the first diplexer.

15. A base station antenna unit, comprising:
a first base station antenna that comprises a first housing that includes a first radome;
a second base station antenna mounted above the first base station antenna, the second base antenna comprising a second housing that includes a second radome;
wherein an externally-accessible compartment is provided in the first housing and a plurality of radio frequency ("RF") connector ports are provided within the externally-accessible compartment.

16. The base station antenna unit of claim 15, wherein the compartment includes a floor, a pair of sidewalls and a front wall.

17. The base station antenna unit of claim 16, further comprising a moveable cover that forms a rear wall of the compartment.

18. The base station antenna unit of claim 16, wherein a plurality of jumper cables extend through respective openings in the floor of the externally-accessible compartment, and the RF connector ports are mounted on the respective jumper cables.

19. The base station antenna unit of claim 15, wherein the housing of the first base station antenna further comprises a top end cap, and the externally-accessible compartment is formed in the top end cap.

20. The base station antenna unit of claim 15, wherein the RF connector ports are mounted within a moveable connector support.

* * * * *